United States Patent
Lee et al.

(10) Patent No.: US 10,512,101 B2
(45) Date of Patent: Dec. 17, 2019

(54) METHOD FOR TERMINAL FOR CARRYING OUT CARRIER AGGREGATION IN WIRELESS COMMUNICATION SYSTEM AND TERMINAL UTILIZING THE METHOD

(71) Applicant: LG ELECTRONICS INC., Seoul (KR)

(72) Inventors: Seungmin Lee, Seoul (KR); Suckchel Yang, Seoul (KR); Joonkui Ahn, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/574,063

(22) PCT Filed: May 16, 2016

(86) PCT No.: PCT/KR2016/005179
§ 371 (c)(1),
(2) Date: Nov. 14, 2017

(87) PCT Pub. No.: WO2016/182414
PCT Pub. Date: Nov. 17, 2016

(65) Prior Publication Data
US 2018/0295643 A1   Oct. 11, 2018

Related U.S. Application Data

(60) Provisional application No. 62/161,877, filed on May 14, 2015.

(51) Int. Cl.
*H04W 72/14* (2009.01)
*H04L 5/00* (2006.01)
(Continued)

(52) U.S. Cl.
CPC ............. *H04W 72/14* (2013.01); *H04L 5/001* (2013.01); *H04L 5/0053* (2013.01);
(Continued)

(58) Field of Classification Search
CPC ............. H04W 72/14; H04W 72/1289; H04W 72/0413; H04W 72/0453; H04L 5/0055; H04L 5/14
See application file for complete search history.

(56) References Cited

U.S. PATENT DOCUMENTS

2011/0319121 A1   12/2011   Jen
2012/0026985 A1   2/2012   Ren et al.
(Continued)

FOREIGN PATENT DOCUMENTS

KR   1020130072240   7/2013

OTHER PUBLICATIONS

3GPP TS 36.211 V8.5.0, Dec. 2008.
(Continued)

*Primary Examiner* — Sai Aung
*Assistant Examiner* — Liem H Nguyen
(74) *Attorney, Agent, or Firm* — Dentons US LLP

(57) ABSTRACT

The present method, for a terminal carrying out carrier aggregation in a wireless communication system, comprises the steps of: receiving, from a base station, at least one downlink grant; determining whether or not the at least one downlink grant corresponds to a valid downlink grant; and on the basis of the determination, transmitting a physical uplink control channel (PUCCH), wherein the PUCCH transmission step, on the basis of the determination, comprises the steps of: if a downlink grant included in the at least one downlink grant is a valid down grant, then transmitting a PUCCH associated with the valid downlink grant; and if a downlink grant included in the at least one downlink grant is not a valid down grant.

2 Claims, 14 Drawing Sheets

(51) Int. Cl.
*H04L 5/14* (2006.01)
*H04W 72/04* (2009.01)
*H04W 72/12* (2009.01)

(52) U.S. Cl.
CPC .............. *H04L 5/0055* (2013.01); *H04L 5/14* (2013.01); *H04W 72/0413* (2013.01); *H04W 72/0453* (2013.01); *H04W 72/1278* (2013.01); *H04W 72/1289* (2013.01)

(56) References Cited

U.S. PATENT DOCUMENTS

| | | | | |
|---|---|---|---|---|
| 2012/0093073 | A1* | 4/2012 | Lunttila | H04L 1/1607 370/328 |
| 2013/0028205 | A1* | 1/2013 | Damnjanovic | H04L 5/001 370/329 |
| 2013/0188590 | A1* | 7/2013 | Aiba | H04L 1/1861 370/329 |
| 2013/0235854 | A1* | 9/2013 | Li | H04L 1/1861 370/336 |
| 2014/0092824 | A1* | 4/2014 | He | H04W 4/70 370/329 |
| 2014/0177555 | A1* | 6/2014 | Ng | H04W 72/0406 370/329 |
| 2014/0301280 | A1* | 10/2014 | Che | H04L 5/0055 370/329 |
| 2018/0102892 | A1* | 4/2018 | Lunttila | H04L 1/1607 |

OTHER PUBLICATIONS

LG Electronics, "DAI Signaling in DL Assignment for CA with Different TDD UL-DL," R1-130240, 3GPP TSG RAN WG1 Meeting #72, Jan. 18, 2013, see section 2.
Research in Motion, UK Limited, "Remaining Details of TDD PUCCH Resource Allocation of EPDCCH," R1-130387, 3GPP TSG RAN WG1 Meeting #72, Jan. 19, 2013, see pp. 1-3.
International Search Report of Appl'n No. PCT/KR2016/005179, dated Aug. 9, 2016.

* cited by examiner

METHOD FOR TERMINAL FOR CARRYING OUT CARRIER AGGREGATION IN WIRELESS COMMUNICATION SYSTEM AND TERMINAL UTILIZING THE METHOD

CROSS-REFERENCE TO RELATED APPLICATIONS

This application is the National Stage filing under 35 U.S.C. 371 of International Application No. PCT/KR2016/005179, filed on May 16, 2016, which claims the benefit of U.S. Provisional Application No. 62/161,877 filed on May 14, 2015, the contents of which are all hereby incorporated by reference herein in their entirety.

BACKGROUND OF THE INVENTION

Field of the Invention

The present invention relates to wireless communication and, more particularly, to a CA method performed by a UE in a wireless communication system and a UE using the method.

Related Art

In International Telecommunication Union Radio communication sector (ITU-R), a standardization task for International Mobile Telecommunication (IMT)-Advanced, that is, a next-generation mobile communication system after the $3^{rd}$ generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

The $3^{rd}$ generation partnership project (3GPP) is a system standard to satisfy the requirements of IMT-Advanced and prepares LTE-advanced improved from long term evolution (LTE) based on orthogonal frequency division multiple access (OFDMA)/single carrier-frequency division multiple access (SC-FDMA) transmission schemes. LTE-Advanced is one of strong candidates for IMT-Advanced.

An LTE-A system adopts a carrier aggregation (CA). In this case, the CA means that reception and transmission are performed by aggregating a plurality of component carriers (CCs). A CC may be divided into a primary component carrier (PCC) and a secondary component carrier (SCC). The PCC may be called a primary cell (PCell). Furthermore, other CCs other than one primary CC (PCC) may be defined as secondary CCs (SCCs). The SCC may be called a secondary cell (SCell). A UE may perform uplink transmission through a SCell.

A plurality of cells may be aggregated by a carrier aggregation (CA) scheme. For example, if many cell(s) have been configured according to the CA scheme, a total (E)PDCCH blind decoding (BD) number (e.g., a "total UE-specific search space (USS) number=a USS BD NUMBER×ACTIVATED CELL NUMBER FOR EACH CELL") that needs to be performed by a UE is increased. Accordingly, an (E)PDCCH false detection probability (or number) is also increased.

Furthermore, for example, if a specific UE performs (E)PDCCH false detection-based erroneous PUCCH transmission, a (resource) collision against correct (or normal) PUCCH transmission performed by another UE at the same UL subframe (SF) point of time may be generated. This results in a performance reduction of the corresponding correct (or normal) PUCCH transmission.

Accordingly, the present invention proposes a method of reducing a (PUCCH) performance reduction attributable to (E)PDCCH false detection-based erroneous PUCCH transmission if many cell(s) have been configured according to the CA scheme.

SUMMARY OF THE INVENTION

An object of the present invention is to provide a carrier aggregation (CA) method performed by a UE in a wireless communication system and a UE using the same.

In an aspect, a method for carrier aggregation (CA) performed by a user equipment in a wireless communication system is provided. The method may comprise receiving at least one downlink grant from an eNB, determining whether the at least one downlink grant corresponds to a valid downlink grant, and performing physical uplink control channel (PUCCH) transmission based on the determination. The step of performing the PUCCH transmission based on the determination may comprises performing PUCCH transmission related to a valid downlink grant if a downlink grant included in the at least one downlink grant is a valid downlink grant and not performing PUCCH transmission related to an invalid downlink grant if a downlink grant included in the at least one downlink grant is an invalid downlink grant.

The step of determining whether the at least one downlink grant corresponds to a valid downlink grant may comprise a step of determining a plurality of downlink grants to be invalid downlink grants if the plurality of downlink grants having an identical downlink assignment index (DAI) value within one bundling window is detected.

The step of determining whether the at least one downlink grant corresponds to a valid downlink grant may comprise steps of: determining one of a plurality of downlink grants to be a valid downlink grant if the plurality of downlink grants having an identical downlink assignment index (DAI) value within one bundling window is detected and determining downlink grants other than the one downlink grant of the plurality of downlink grants to be invalid downlink grants.

The step of determining whether the at least one downlink grant corresponds to a valid downlink grant may comprise a step of determining a plurality of downlink grants to be invalid downlink grants if the plurality of downlink grants having downlink assignment index (DAI) values corresponding to reverse order of subframes within one bundling window is detected.

The step of determining whether the at least one downlink grant corresponds to a valid downlink grant may comprise steps of: determining one of a plurality of downlink grants to be a valid downlink grant if the plurality of downlink grants having downlink assignment index (DAI) values corresponding to reverse order of subframes within one bundling window is detected and determining downlink grants other than the one downlink grant of the plurality of downlink grants to be invalid downlink grants.

The step of determining whether the at least one downlink grant may corresponds to a valid downlink grant comprises a step of determining a plurality of downlink grants received by the user equipment to be invalid downlink grants if a detection interval of a first downlink grant and second downlink grant having an identical downlink assignment index (DAI) value within one bundling window is a predetermined number of subframes or less, and the plurality of downlink grants comprises the first downlink grant and the second downlink grant.

The step of determining whether the at least one downlink grant corresponds to a valid downlink grant may comprise steps of: determining one of a plurality of downlink grants received by the user equipment to be a valid downlink grant if a detection interval of a first downlink grant and second downlink grant having an identical downlink assignment index (DAI) value within one bundling window is a predetermined number of subframes or less and determining downlink grants other than the one downlink grant of the plurality of downlink grants to be invalid downlink grants. The plurality of downlink grants may comprises the first downlink grant and the second downlink grant.

The predetermined number may be 3.

The bundling window may be based on time division duplex (TDD).

The step of determining whether the at least one downlink grant corresponds to a valid downlink grant may comprise a step of determining a downlink grant for a secondary cell (SCELL) to be an invalid downlink grant if only the one downlink grant for the SCELL is received or a step of determining a downlink grant comprising an ACK/NACK resource indicator (ARI) to be an invalid downlink grant if the downlink grant comprising the ARI is received.

The step of determining whether the at least one downlink grant corresponds to a valid downlink grant may comprise a step of determining a plurality of downlink grants to be invalid downlink grants if the plurality of downlink grants for one cell is detected at a specific subframe point of time or a step of determining one of a plurality of downlink grants to be a valid downlink grant if the plurality of downlink grants for one cell is detected at a specific subframe point of time.

The step of determining whether the at least one downlink grant corresponds to a valid downlink grant may comprise a step of if downlink grants having an identical ACK/NACK resource indicator (ARI) value are detected with a specific value or more, determining a downlink grant having an ARI value different from the ARI value to be an invalid downlink grant.

In another aspect, a user equipment is provided. The user equipment may comprise a radio frequency (RF) unit transmitting and receiving radio signals, and a processor operating in conjunction with the RF unit. The processor may receive at least one downlink grant from an eNB, may determine whether the at least one downlink grant corresponds to a valid downlink grant, and may perform physical uplink control channel (PUCCH) transmission based on the determination, and performing the PUCCH transmission based on the determination comprises performing PUCCH transmission related to a valid downlink grant if a downlink grant included in the at least one downlink grant is a valid downlink grant and not performing PUCCH transmission related to an invalid downlink grant if a downlink grant included in the at least one downlink grant is an invalid downlink grant.

In accordance with the present invention, there are provided a carrier aggregation (CA) performed by a UE in a wireless communication system and a UE using the same.

In accordance with the present invention, a UE can transmit/receive a large amount of data because a CA can be configured with respect to a large number of cells.

In accordance with the present invention, a UE provides a method of reducing a (PUCCH) performance reduction attributable to (E)PDCCH false detection-based erroneous PUCCH transmission if many cell(s) have been configured according to the CA scheme. Specifically, a UE in the present invention can determine a received downlink grant to be an invalid downlink grant, can omit PUCCH transmission related to the downlink grant determined to be not valid, and can reduce a (PUCCH) performance reduction attributable to (E)PDCCH false detection-based erroneous PUCCH transmission in specific conditions.

DESCRIPTION OF EXEMPLARY EMBODIMENTS

Figure 1:
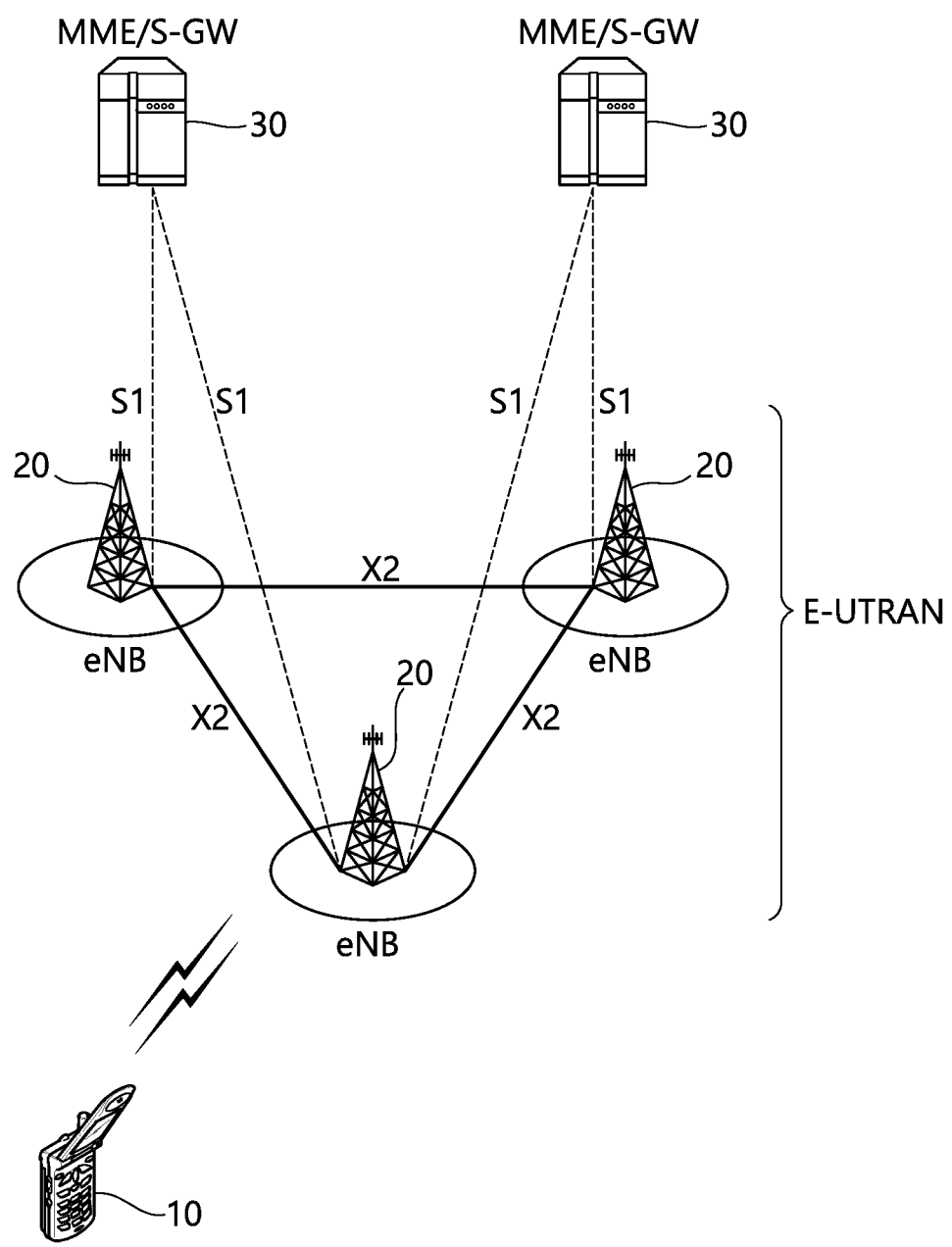
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
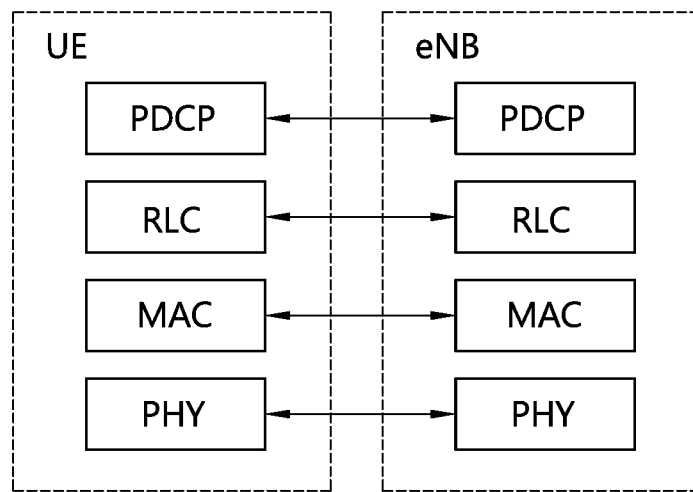
FIG. 2 is a diagram showing a wireless protocol architecture for a user plane.
Figure 3:
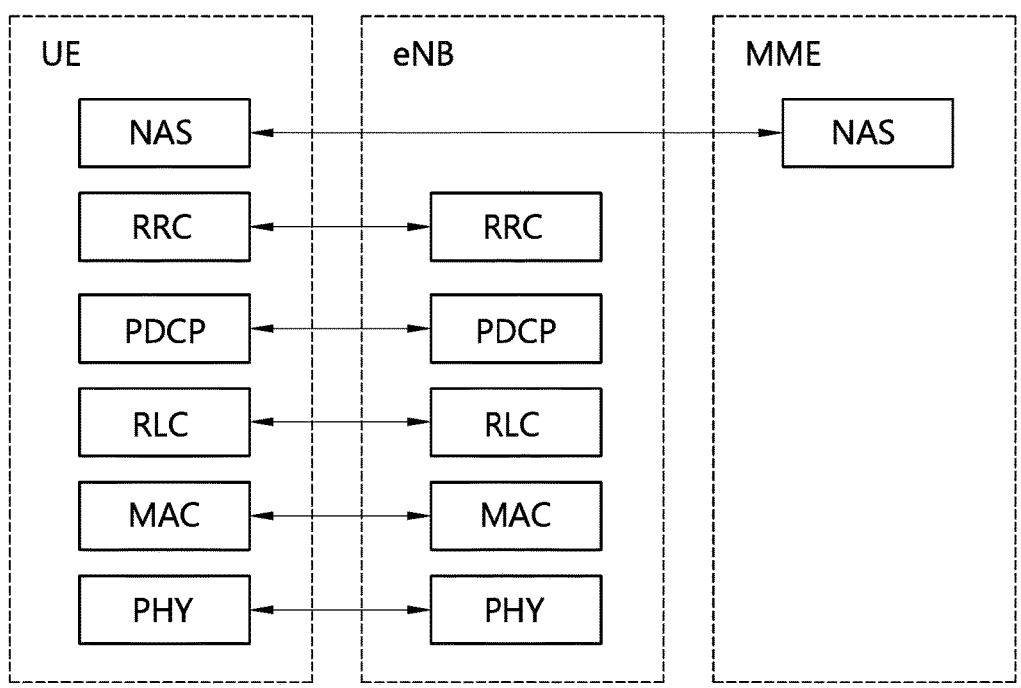
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Figure 4:
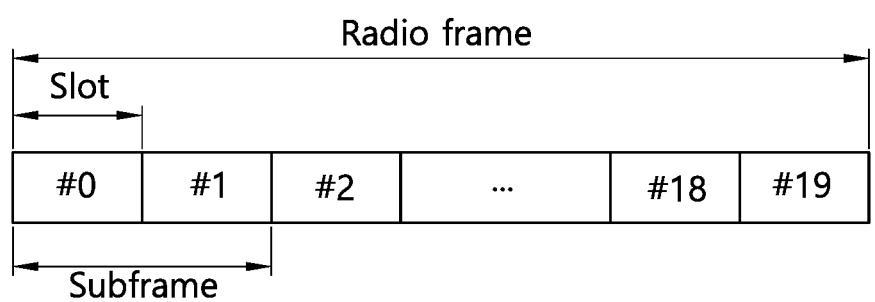
FIG. 4 shows a radio frame structure of 3GPP LTE.

FIG. 4 shows a radio frame structure of 3GPP LTE.

Referring to FIG. 4, the radio frame includes 10 subframes, and one subframe includes two slots. For example, the length of one subframe may be 1 ms, and the length of one slot may be 0.5 ms. The time taken for one subframe to be transmitted is called a transmission time interval (TTI). The TTI may be a minimum unit of scheduling. The structure of the radio frame is only illustrative, and the number of subframes included in a radio frame and the number of slots included in a subframe may be changed in various ways.

Figure 5:
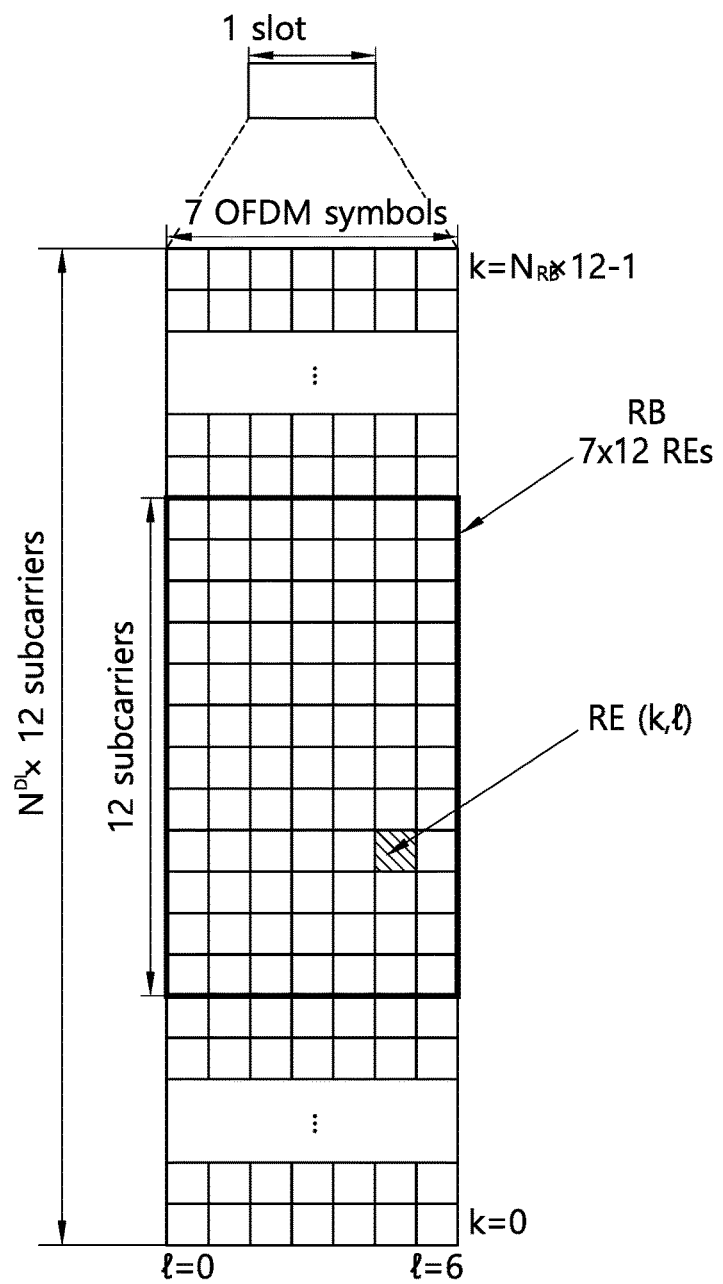
FIG. 5 is an exemplary diagram showing a resource grid for one downlink slot.

FIG. 5 is an exemplary diagram showing a resource grid for one downlink slot.

In a radio frame, one slot includes a plurality of orthogonal frequency division multiplexing (OFDM) symbols in a time domain. The OFDM symbol is for representing one symbol period because 3GPP LTE uses OFDMA in the downlink, and may be call another name depending on a multi-access method. For example, if SC-FDMA is used, the OFDM symbol may be called an SC-FDMA symbol. One slot has been illustrated as including 7 OFDM symbols, but the number of OFDM symbols included in one slot may be changed depending on the length of a cyclic prefix (CP). In accordance with 3GPP TS 36.211 V8.5.0 (2008-12), one subframe includes 7 OFDM symbols in a normal CP, and one subframe includes 6 OFDM symbols in an extended normal CP.

Furthermore, one slot includes a plurality of resource blocks (RBs) in a frequency domain. A resource block is a resource allocation unit and includes a plurality of contiguous subcarriers in one slot. In the resource block, a subcarrier may have an interval of 15 KHz, for example.

Each element on the resource grid is called a resource element (RE), and one resource block includes 12×7 resource elements. The number of resource blocks NDL included in a downlink slot depends on a downlink transmission bandwidth configured in a cell. The resource grid described in FIG. 5 may also be applied to the uplink.

Figure 6:
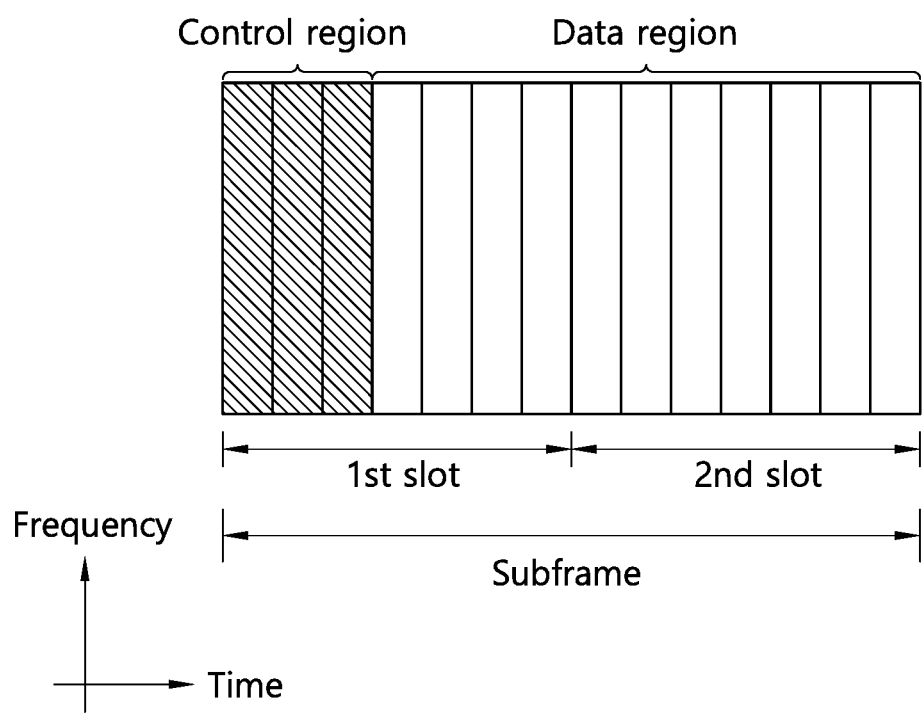
FIG. 6 shows the structure of a downlink subframe.

FIG. 6 shows the structure of a downlink subframe.

Referring to FIG. 6, the subframe includes two consecutive slots. A maximum of former 3 OFDM symbols in a first slot within the subframe are a control region to which control channels are allocated. The remaining OFDM symbols are a data region to which data channels are allocated. The control region may include a maximum of 4 OFDM symbols depending on a system band.

The control channels allocated to the control region include a physical control format indication channel (PCFICH), a physical hybrid-ARQ indicator channel (PHICH) and a physical downlink control channel (PDCCH). The PCFICH is a control channel in which information indicative of the size of the control region, that is, the number of OFDM symbols forming the control region, is transmitted. The PHICH is a control channel on which acknowledgement/not-acknowledgement (ACK/NACK) for the uplink data transmission of a UE is carried. The PDCCH may carry the resource allocation (this is called a downlink grant) and transmission format of a downlink-shared channel (DL-SCH), resource allocation information (this is called an uplink grant) of an uplink shared channel (UL-SCH), paging information on a paging channel (PCH), system information on a DL-SCH, the resource allocation of a high layer control message such as a random access response transmitted on a PDSCH, a set of transmission power control (TPC) commands for each UE within a specific UE group, the activation of a voice over Internet protocol (VoIP) and so on. Control information transmitted through a PDCCH is called downlink control information (DCI).

A DCI format includes a format 0 for physical uplink shared channel (PUSCH) scheduling, a format 1 for the scheduling of one physical downlink shared channel (PDSCH) codeword, a format 1A for the compact scheduling of one PDSCH codeword, a format 1B for compact scheduling for the rank-1 transmission of a single codeword in a spatial multiplexing mode, a format 1C for the very compact scheduling of a downlink shared channel (DL-SCH), a format 1D for PDSCH scheduling in a multi-user spatial multiplexing mode, a format 2 for PDSCH scheduling in a closed-loop spatial multiplexing mode, a format 2A for PDSCH scheduling in an open-loop spatial multiplexing mode, a format 3 for the transmission of the transmission power control (TPC) command of 2-bit power control for a PUCCH and PUSCH, a format 3A for the transmission of a TPC command of bit power control for a PUCCH and PUSCH.

Figure 7:
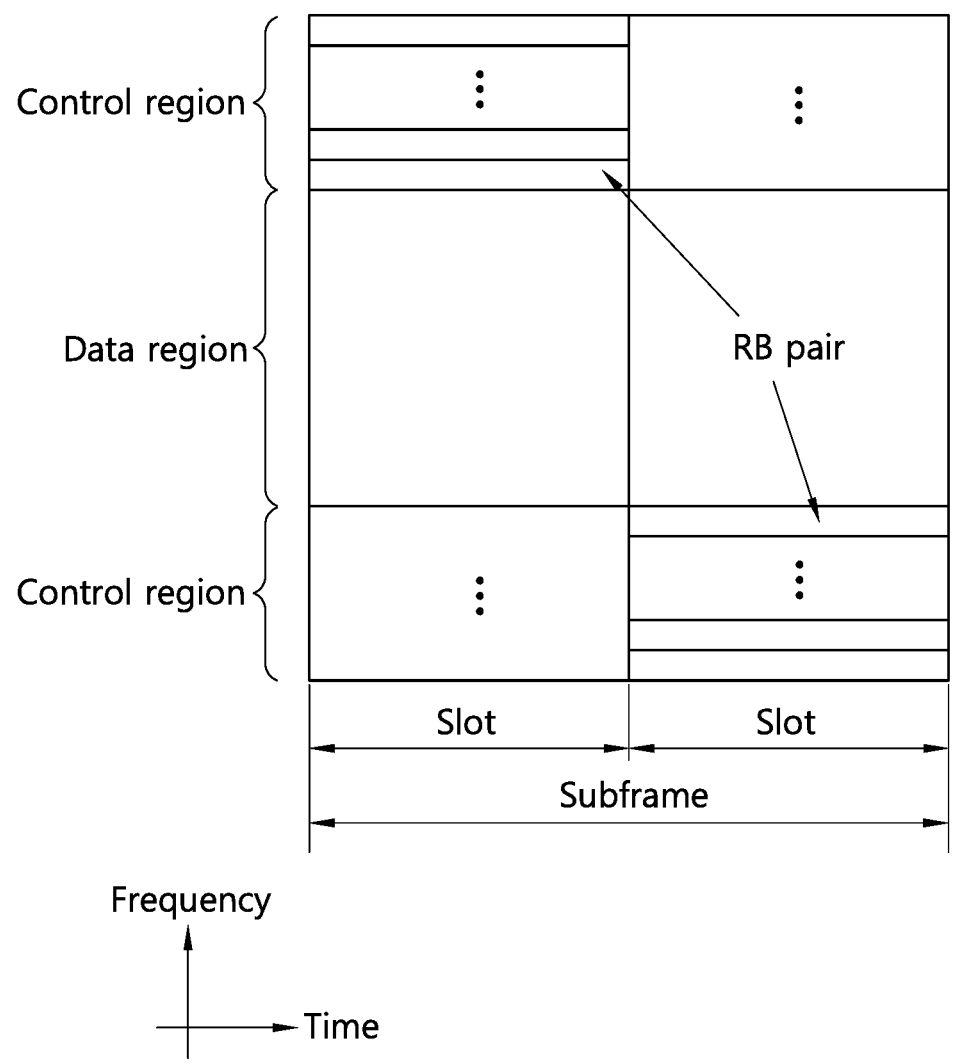
FIG. 7 shows the structure of an uplink subframe.

FIG. 7 shows the structure of an uplink subframe.

Referring to FIG. 7, the uplink subframe may be divided into a control region to which a physical uplink control channel (PUCCH) carrying uplink control information is allocated and a data region to which a physical uplink shared channel (PUSCH) carrying user data is allocated in the frequency domain.

A PUCCH for one UE is allocated as a resource block (RB) pair in a subframe. RBs belonging to an RB pair occupy different subcarriers in two slots. This is said that an RB pair allocated to a PUCCH has been subjected to frequency hopping in a slot boundary.

In what follows, a carrier aggregation system will be described.

The LTE-A system adopts carrier aggregation (CA), where the carrier aggregation refers to reception and transmission based on aggregation of a plurality of component carriers (CCs). Based on the carrier aggregation, the LTE system extends transmission bandwidth of a UE and increases utilization efficiency of frequency resources.

A component carrier may be divided into a Primary Component Carrier (PCC) and a Secondary Component Carrier (SCC). A PCC is such a kind of component carrier that performs a central role of managing component carriers in a situation where multiple component carriers are used, and a PCC is defined for each UE. A PCC may be called a Primary cell (Pcell).

Other component carriers other than the single PCC may be defined as SCCs. An SCC may be called a Secondary cell (Scell), and a UE may perform uplink transmission through a secondary cell.

Figure 8:
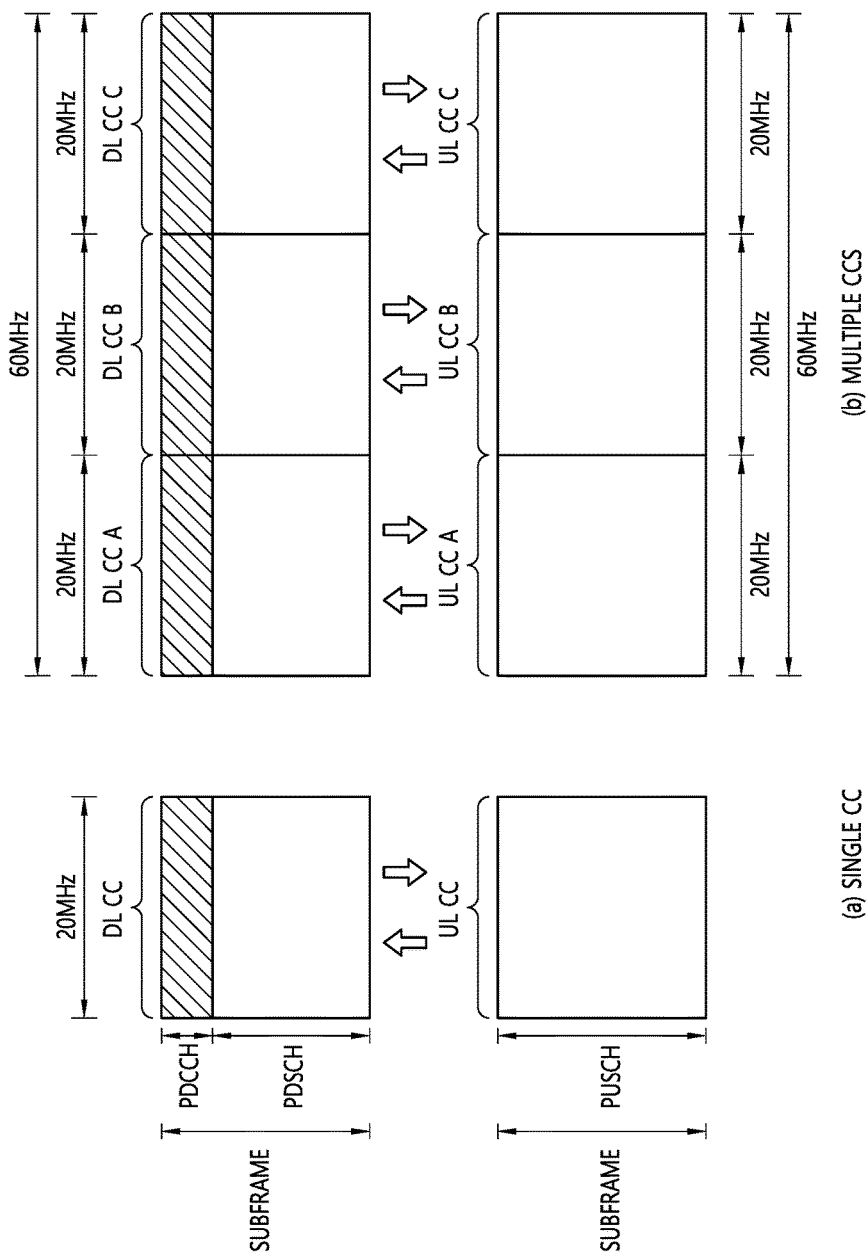
FIG. 8 is an example of comparing a single carrier system with a carrier aggregation system.

FIG. 8 is an example of comparing a single carrier system with a carrier aggregation system.

Referring to FIG. 8, a single carrier system supports only one carrier component for uplink and downlink transmission of a UE. Although the bandwidth of a carrier may be varied, only one carrier is allocated to the UE. On the other hand, a carrier aggregation (CA) system may allocate a plurality of component carriers (DL CCA to C, UL CC A to C) to a UE. For example, three 20 MHz component carriers may be used to allocate bandwidth of 60 MHz to a UE.

A carrier aggregation system may be divided into a contiguous carrier aggregation system in which carriers are contiguous with each other and a non-contiguous carrier aggregation system in which carriers are separated from each other. In what follows, when a system is simply referred to as a carrier aggregation system, it should be understood that the system includes both the contiguous and the non-contiguous case.

When more than one component carrier is aggregated, a target component carrier may use the bandwidth of an existing system for backward compatibility with the existing system. For example, the 3GPP LTE system supports bandwidth of 1.4 MHz, 3 MHz, 5 MHz, 10 MHz, 15 MHz, and 20 MHz while the 3GPP LTE-A system may construct a broadband larger than 20 MHz by using only the bandwidth of the 3GPP LTE system. Or, the 3GPP LTE-A system may construct a broadband by defining new bandwidth instead of using the bandwidth of the existing system.

The system frequency band of a wireless communication system may be described by a plurality of carrier frequencies. Here, a carrier frequency refers to the center frequency of a cell. In what follows, a cell is described as being composed of a pair of downlink frequency resources and uplink frequency resources. Or, a cell may be constructed by using downlink frequency resources only. For most cases, when carrier aggregation is not considered, uplink and downlink frequency resources in a single cell are always defined in pairs.

To perform transmission and reception of packet data through a specific cell, a UE first has to complete configuration of the specific cell. At this time, configuration refers to a state in which a UE has completed reception of system information required for transmitting and receiving data to and from the corresponding cell. For example, configuration may include an overall process of receiving common physical layer parameters required for transmission and reception of data, MAC layer parameters, or parameters required for a specific operation in the RRC layer. A completely configured cell is capable of transmitting and receiving packets immediately as soon as the cell receives the information that packet data may be transmitted.

A cell in a configuration completed status may be in the activation or deactivation state. Here, activation refers to a situation in which a cell performs transmission or reception of data, or the cell is in a ready state. A UE may monitor or receive a control channel (PDCCH) or a data channel (PDSCH) of an activated cell to check resources (which may be frequency or time resources) allocated to the UE.

Deactivation refers to a situation in which a cell is unable to transmit or receive traffic data but capable of measuring or transmitting/receiving least information. A UE may receive system information (SI) required for receiving packets from a deactivated cell. On the other hand, a UE does not monitor nor receive a control channel (PDCCH) and a data channel (PDSCH) of a deactivated cell to check resources (which may be frequency or time resources) allocated to the UE.

A cell may be classified by a primary cell (Pcell), secondary cell (Scell), or a serving cell.

If carrier aggregation is configured, a UE holds only one RRC connection to the network. During the RRC connection establishment/re-establishment/handover process, one cell provides NAS (Non-Access Stratum) mobility information and security input. The aforementioned cell is called a primary cell. In other words, a primary cell refers to the cell in which a UE performs an initial connection establishment procedure or connection re-establishment procedure with respect to an eNB; or the cell designated by the primary cell during the handover process.

A secondary cell refers to the cell configured for providing additional radio resources once an RRC connection is established through a primary cell.

A serving cell refers to the cell configured for providing a service to a UE; when carrier aggregation is not configured or a UE is incapable of providing carrier aggregation, a primary cell is configured as a serving cell. When carrier aggregation is configured, a serving cell may comprise a plurality of serving cells. A plurality of serving cells may be configured to comprise a set of a primary cell and one or more secondary cells.

A PCC (Primary Component Carrier) refers to a CC corresponding to a primary cell. A PCC is such a kind of CC that establishes a connection or an RRC connection with an eNB at the initial stage. A PCC is a special CC that is responsible for a connection or an RRC connection for signaling of a plurality of CCs and manages UE context which is connection information related to a UE. Also, when a PCC is connected to a UE and stays in the RRC Connected mode, the PCC is always in the activation state. A downlink component carrier corresponding to a primary cell is called a DownLink Primary Component Carrier (DL PCC), and an uplink component carrier corresponding to a primary cell is called an UpLink Primary Component Carrier (UL PCC).

An SCC (Secondary Component Carrier) refers to a CC corresponding to a secondary cell. In other words, an SCC is such a kind of CC allocated to a UE in addition to a PCC; an SCC is an extended carrier used for additional resource allocation along with a PCC, which may be in the activation or deactivation mode. A downlink component carrier corresponding to a secondary cell is called a DL Secondary CC (DL SCC), and an uplink component carrier corresponding to a secondary cell is called an UL Secondary CC (UL SCC).

In the case of a component carrier comprising a serving cell, a downlink component carrier may form one serving cell, or a downlink component carrier and an uplink component carrier may be configured to be connected to each other to form one serving cell. Conventionally, only one uplink component does not form a serving cell. However, according to the present invention, a serving cell may be formed by using only uplink component carriers.

Activation/deactivation of a component carrier is directly equivalent to the concept of activation/deactivation of a serving cell. For example, assuming that serving cell 1 comprises DL CC1, activation of the serving cell 1 indicates activation of the DL CC1. If serving cell 2 comprises DL CC2 and UL CC2 being connected to each other, activation of the serving cell 2 indicates activation of DL CC2 and UL CC2. In this sense, each component carrier may correspond to a cell.

The number of component carriers aggregated may be set differently for downlink and uplink. When the number of downlink CCs is the same as the number of uplink CCs, it is called symmetric aggregation; otherwise, it is called asymmetric aggregation. Also, sizes (namely bandwidth) of CCs may vary from each other. For example, suppose that 5 CCs are used to form the bandwidth of 70 MHz. Then the bandwidth may be configured by a combination of 5 MHz CC (carrier #0), 20 MHz CC (carrier #1), 20 MHz CC (carrier #3), and 5 MHz CC (carrier #4).

As described above, different from a single carrier system, a carrier aggregation system may support a plurality of serving cells, namely a plurality of CCs (Component Carriers).

Meanwhile, a carrier aggregation system may support cross-carrier scheduling (CCS). CCS may be used for allocating resources of the PDSCH transmitted through another component carrier by using the PDCCH transmitted through a specific component carrier and/or for allocating resources of the PUSCH transmitted through another component carrier rather than the component carrier linked to the specific component carrier by default. In other words, the PDCCH and the PDSCH may be transmitted through different DL CCs, and the PUSCH may be transmitted through a UL CC belonging to a different cell rather than the UL CC linked to a DL CC to which the PDCCH including a UL grant is transmitted, namely the UL CC constituting the same cell. As described above, a system supporting the CCS requires a carrier indicator indicating a DL CC/UL CC through which the PDSCH/PUSCH is transmitted, the PDSCH/PUSCH being scheduled by the PDCCH.

A carrier aggregation system supporting the CCS may include a carrier indication field (CIF) in the conventional DCI (Downlink Control Information) format. Since a system supporting the CCS, for example, the LTE-A system adds the CIF to the conventional DCI format (namely the DCI format used in the LTE system), the conventional DCI format may be extended by 3 bits, and the PDCCH structure may re-use the existing coding method, resource allocation method (namely CCE-based resource mapping), and so on.

An eNB may configure a set of PDCCH monitoring DL CCs (monitoring CCs). A PDCCH monitoring DL CC set consists of part of DL CCs from among the entire DL CCs aggregated, and if the CCS is configured, the UE performs PDCCH monitoring/decoding only for the DL CC belonging to the PDCCH monitoring DL CC set. In other words, the eNB transmits the PDCCH that schedules the PDSCH/PUSCH only through the DL CC belonging to the PDCCH monitoring DL CC set. The PDCCH monitoring DL CC set may be configured in a UE-specific, UE group specific, or cell-specific manner.

Non-Cross Carrier Scheduling (NCCS) refers to receiving/transmitting scheduling information and accompanying data within the same carrier (cell), which may also be called self-scheduling. NCCS may be regarded as a scheduling method that has been conventionally applied for a UE for which only one cell is configured.

Hereinafter, a cyclic redundancy check is described.

In 3GPP LTE, blind decoding is used for the detection of a PDCCH. Blind decoding is a method of demasking a desired identifier to the cyclic redundancy check of a PDCCH (this is called a candidate PDCCH) and confirming whether a corresponding PDCCH is its own control channel or not by checking a CRC error. An eNB determines a PDCCH format depending on DCI to be transmitted to a wireless device, attaches CRC to the DCI, and masks a unique identifier (this is called a radio network temporary identifier (RNTI)) to the CRC depending on the owner or use of a PDCCH.

Hereinafter, an example of the CRC generation and scrambling operation of a DL/UL grant is described, for convenience of understanding.

1. CRC Calculation

CRC computation for input bits is expressed as $a_0, a_1, a_2, a_3, \ldots, a_{A-1}$, and parity bits for the input bits are expressed as $p_0, p_1, p_2, p_3, \ldots, p_{L-1}$. A means the size of an input sequence, and L indicates the number of parity bits. The parity bits are generated by one of the following cycle generator polynomials.

$g_{CRC24A}(D)=[D^{24}+D^{23}+D^{18}+D^{17}+D^{14}+D+D^{10}+D+D^6+D^5+D^4+D^3+D+1]$ and;

$g_{CRC24B}(D)=[D^{24}+D^{23}+D^6+D^5+D+1]$ for a CRC length L=24 and;

$g_{CRC16}(D)=[D^{16}+D^{12}+D^5+1]$ for a CRC length L=16.

$g_{CRC8}(D)=[D+D^7+D^4+D^3+D+1]$ for a CRC length of L=8.

Encoding is performed in a systematic form. In this case, the systematic form means GF(2). An equation $a_0D^{A+23}+a_1D^{A+22}+\ldots+a_{A-1}D^{24}+p_0D^{23}+p_1D^{22}\ldots+p_{22}D^1+p_{23}$ is calculated so that the remainder becomes 0 if a corresponding length-24 CRC generator equation $g_{CRC24A}(D)$ or $g_{CRC24B}(D)$ is split. An equation $a_0D^{A+5}+a_1D^{A+14}+\ldots+a_{A-1}D^{16}+p_0D^{15}+p_1D^{14}\ldots+p_{14}D^1+p_{15}$ is calculated so that the remainder becomes 0 if the equation is split by $g_{CRC16}(D)$. An equation $a_0D^{A+7}+a_1D^{A+6}+\ldots+a_{A-1}D^8+p_0D^7+p_1D^6\ldots+p_6D^1+p_7$ is calculated so that the remainder becomes 0 if the equation is split by $g_{CRC8}(D)$.

Bits after CRC attachment may be expressed as $b_0, b_1, b_2, b_3, \ldots, b_{B-1}$, and B=A+L. In this case, a relation between $a_k$ and $b_k$ may be expressed as follows.

$b_k=a_k$ for k=0, 1, 2, . . . , A−1
$b_k=p_{k-A}$ for k=A, A+1, A+2, . . . , A+L−1.

2. CRC Attachment

Error detection is provided on DCI transmission through CRC.

Overall payload is used to calculate a CRC parity bit. The bits of the payload is expressed as $a_0, a_1, a_2, a_3, \ldots, a_{A-1}$, and the parity bits are expressed as $p_0, p_1, p_2, p_3, \ldots, p_{L-1}$. In this case, A means the size of the payload, and L means the number of parity bits.

A parity bit is computed and attached according to the aforementioned 1. CRC computation. Accordingly, L is set to 16 bits, and corresponding results have the results of a sequence $b_0, b_1, b_2, b_3, \ldots, b_{A-1}$ if B=A+L.

If closed-loop UE transmission antenna selection has not been configured or not applicable, after the aforementioned attachment, CRC parity bits may be scrambled so that a corresponding RNTI ($x_{rnti,0}, x_{rnti,1}, \ldots, x_{rnti,15}$, in this case, $x_{rnti,0}$ corresponds to the MSB of the RNTI) forms the sequence of bits $c_0, c_1, c_2, c_3, \ldots, c_{B-1}$.

In this case, a relation between $c_k$ and $b_k$ is as follows.

$c_k=b_k$ for k=0, 1, 2, . . . , A−1
$c_k=(b_k+x_{rnti,k-A})\mod 2$ for k=A, A+1, A+2, . . . , A+15.

If closed-loop UE transmission antenna selection has been configured or applied, after the aforementioned attachment, CRC parity bits having the DCI format 0 may be scrambled so that the antenna selection mask $x_{AS,0}, x_{AS,1}, \ldots, x_{AS,15}$ indicated in Table 1 below and a corresponding RNTI $x_{rnti,0}, x_{rnti,1}, \ldots, x_{rnti,15}$ form the bits $c_0, c_1, c_2, c_3, \ldots, c_{B-1}$.

In this case, a relation between $c_k$ and $b_k$ is as follows.

$c_k=b_k$ for k=0, 1, 2, . . . , A−1
$c_k=b_k+x_{rnti,k-A}+x_{AS,k-A})\mod 2$ for k=A, A+1, A+2, . . . , A+15.

If closed-loop UE transmission antenna selection is configured or applied, after the aforementioned attachment, CRC parity bits having the DCI format 0 may be scrambled so that the antenna selection mask $x_{AS,0}, x_{AS,1}, \ldots, x_{AS,15}$ indicated in Table below and a corresponding RNTI $x_{rnti,0}, x_{rnti,1}, \ldots, x_{rnti,15}$ form the bits $c_0, c_1, c_2, c_3, \ldots, c_{B-1}$.

In this case, a relation between $c_k$ and $b_k$ is as follows.

$c_k=b_k$ for k=0, 1, 2, . . . , A−1
$c_k=b_k+x_{rnti,k-A}+x_{AS,k-A})\mod 2$ for k=A, A+1, A+2, . . . , A+15.

TABLE 1

| UE transmit antenna selection | Antenna selection mask $<x_{AS,0}, x_{AS,1}, \ldots, x_{AS,15}>$ |
|---|---|
| UE port 0 | <0, 0, 0, 0, 0, 0, 0, 0, 0, 0, 0, 0, 0, 0, 0, 0> |
| UE port 1 | <0, 0, 0, 0, 0, 0, 0, 0, 0, 0, 0, 0, 0, 0, 0, 1> |

Hereinafter, the present invention is described.

As described above, a plurality of cells may be aggregated due to a carrier aggregation (CA) scheme. For example, if many cell(s) have been configured according to the CA scheme, a total (E)PDCCH blind decoding (BD) number (e.g., a "total UE-specific search space (USS) BD number=A USS BD number×an activated cell number for each cell") that needs to be performed by a UE is increased. Accordingly, an (E)PDCCH false detection probability (or number) is relatively increased.

Furthermore, for example, if a specific UE performs (E)PDCCH false detection-based erroneous PUCCH transmission, a (resource) collision against correct (or normal) PUCCH transmission performed by another UE at the same UL subframe (SF) point of time may be generated. This results in a performance reduction of corresponding correct (or normal) PUCCH transmission.

Accordingly, there is proposed a method of reducing a (PUCCH) performance reduction attributable to (E)PDCCH false detection-based erroneous PUCCH transmission if many cell(s) have been configured according to the CA scheme in the present invention.

Hereinafter, for convenience of description, for example, a licensed band-based cell and an unlicensed band (LTE-U)-based (S)CELL are called an "LCELL" and an "UCELL", respectively. Furthermore, a resource period aperiodically secured/configured in a corresponding UCELL is called a "reserved resource period (RRP)."

For another example, a PDSCH-related control information channel transmitted on the downlink subframe (DL SF) (i.e., a subframe designated for downlink use) (or a PUSCH-related control information channel transmitted on an uplink subframe (UL SF) of an RRP (i.e., a subframe designated for uplink use)) of an RRP may be configured so that it is transmitted from a predetermined LCELL (i.e., called "cross carrier scheduling (CCS)") or a rule may be defined so that the control information channel is transmitted by the same UCELL (i.e., called "self-scheduling (SFS)").

For another example, a PDSCH reception-related downlink control information channel in the RRP may be implemented in a form in which one downlink control information channel schedules one PDSCH received at the same (or specific) point of time (i.e., called "single subframe scheduling (SSFS)") or may be implemented in a form in which one downlink control information channel schedules a predetermined (or signaled) number of PDSCHs received at a different point of time in addition to one PDSCH received at the same (or specific) point of time (i.e., called "multi-subframe scheduling (MSFS)").

For example, when considering that an RRP in an UCELL is a resource aperiodically or discontiguously configured depending on CS results, the corresponding RRP may be (re)defined (or (re)analyzed) from the viewpoint of a UE operation and assumption.

In this case, for example, the RRP in the UCELL may be (re)defined as the period in which a UE performs a (time/frequency) synchronization operation on the UCELL (from an eNB) and a synchronization signal (e.g., PSS, SSS) for the (time/frequency) synchronization operation is transmitted and/or the period in which a UE performs a CSI measurement operation on the UCELL (from an eNB) and a reference signal (e.g., CRS, CSI-RS) for the CSI measurement operation is transmitted and/or the period in which a UE performs a data transmission (/reception)-related DCI detection operation in the UCELL and/or the period in which a UE performs a (momentary or temporary) buffering operation on a signal received in the UCELL.

Hereinafter, proposed methods are described based on the 3GPP LTE system, for convenience of description. However, the range of a system to which the proposed methods are applied may be extended to other systems in addition to the 3GPP LTE system.

The following proposed methods propose methods of reducing a (PUCCH) performance reduction attributable to (E)PDCCH false detection-based erroneous PUCCH transmission if many cell(s) have been configured according to the CA scheme.

In this case, for example, such proposed methods may be applied without a reduction of a total (E)PDCCH BD number (e.g., a "total USS BD number=a USS BD number for each×the number of activated cells") that needs to be performed by a UE (or along with a reduction of some of the (E)PDCCH BD number (based on a predetermined (or signaled) rule).

Furthermore, for example, the proposed methods may be defined so that a rule is limitedly applied to only a case where a massive CA mode has been configured and/or a (DL) cell(s) (or a (DL) LCELL(s) or (DL) UCELL(s) or (DL) LCELL(s)/UCELL(s)) has been set as a predetermined (or signaled) number or more (or a case where a configured (DL) cells(s) (or configured (DL) LCELL(s) or configured (DL) UCELL(s) or configured (DL) LCELL(s)/UCELL(s)) has been set as a predetermined (or signaled) number or more) and/or a case where an activated (DL) cell(s) (or activated (DL) LCELL(s) or activated (DL) UCELL(s) or activated (DL) LCELL(s)/UCELL(s)) has been set as a predetermined (or signaled) number or more and/or a case where a (PUCCH) cell group (CG) has been set as a predetermined (or signaled) number or more and/or if PUCCH transmission on a predetermined (or signaled) SCELL has been configured.

Furthermore, for example, in the following proposed methods, invalid DL grant-related (corresponding) HARQ-ACK PUCCH transmission may be construed as being omitted. For another example, (some or all of) the following proposed methods may be defined so that a rule is limited applied to only at an SF point of time at which the number of DL SF(s) on a configured cell(s) (or activated cell(s)) is a predetermined (or signaled) threshold or more.

Figure 9:
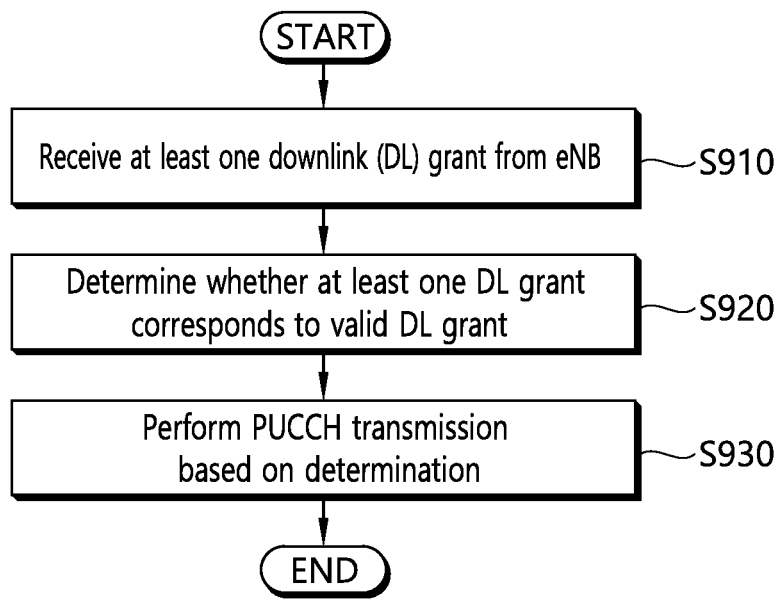
FIG. 9 is a flowchart of a CA method according to an embodiment of the present invention.

FIG. 9 is a flowchart of a CA method according to an embodiment of the present invention.

Referring to FIG. 9, a UE may receive at least one downlink (DL) grant from an eNB (S910).

Thereafter, the UE determines whether the at least one DL grant corresponds to a valid DL grant (S920). In this case, a detailed example in which the UE determines whether the DL grant corresponds to a valid DL grant is described in proposed methods to be described later.

Thereafter, the UE may perform PUCCH transmission based on the determination (S930). The step of performing the PUCCH transmission based on the determination may include the step of performing PUCCH transmission related to the valid DL grant if the DL grant included in the at least one DL grant is the valid DL grant and the step of not performing PUCCH transmission related to an invalid DL grant if the DL grand included in the at least one DL grant is the invalid DL grant. In this case, the UE may omit PUCCH transmission (or HARQ-ACK PUCCH transmission) corresponding to a DL grant determined (or discarded) to be not valid. That is, the UE may perform PUCCH transmission related to a valid DL grant and may not perform PUCCH transmission related to an invalid DL grant.

Hereinafter, embodiments according to the present invention are described in more detail through the proposed methods to be described later.

[Proposed Method#1]

Figure 10:
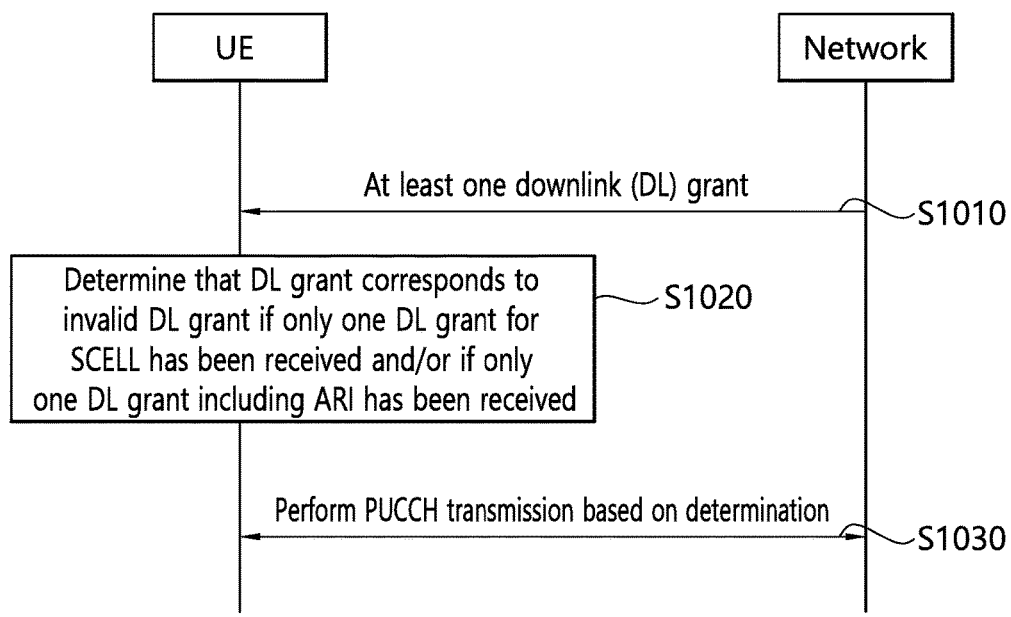
FIG. 10 is a flowchart of a CA method according to another embodiment of the present invention.

FIG. 10 is a flowchart of a CA method according to another embodiment of the present invention.

Referring to FIG. 10, a UE may receive at least one downlink (DL) grant from an eNB (S1010).

Thereafter, the UE determines that the DL grant corresponds to an invalid DL grant if only one DL grant for an SCELL has been received and/or if only one DL grant including an ACK/NACK resource indicator (ARI) has been received (S1020). That is, the UE may determine a DL grant for a secondary cell (SCELL) to be an invalid DL grant if only one DL grant for the SCELL has been received or may determine a DL grant including an ACK/NACK resource indicator (ARI) to be an invalid DL grant if the DL grant including the ARI has been received.

More specifically, a rule may be defined (OPTION#1-1) so that the UE omits (or drops) corresponding HARQ-ACK PUCCH transmission if only one DL grant for an SCELL has been received (at a specific SF point of time) (CASE#1-1) and/or if only one a DL grant including an ARI has been received (CASE#1-2).

In this case, for example, (CASE#1-1) may be (limitedly) applied to an FDD CASE.

Furthermore, for example, (CASE#1-2) includes a case where only one PCELL (/PUCCH SCELL (i.e., an SCELL in which PUCCH transmission has been configured)) DL grant of a "downlink assignment index (DAI))>1" has been received. Furthermore, (CASE#1-2) may be (limitedly) applied to a TDD CASE.

Furthermore, for example, a rule may be defined so that a DL grant-based PDSCH reception signal related to (or associated with) the omitted HARQ-ACK PUCCH transmission is not stored in its own buffer.

In this case, for example, the application of such a rule may be analyzed so that a corresponding DL grant (related to (or associated with) the omitted HARQ-ACK PUCCH transmission) is considered to be false detection.

For another example, a rule may be defined so that a DL grant-related CRC length for a PCELL (/PUCCH SCELL) is increased (e.g., 24 bits) compared to the existing bits (e.g., 16 bits).

For another example, a rule may be defined so that the CRC length of a DL grant for a PCELL (/PUCCH SCELL) and/or a predetermined (or signaled) SCELL is increased (e.g., 24 bits) compared to the existing bits (e.g., 16 bits).

In this case, for example, a rule may be defined so that the (OPTION#1-1) is applied to only the remaining cell(s) other than such (CRC length has been increased) cell(s) (in the case of (CASE#1-1) (and/or (CASE#1-2))).

For example, a rule may be defined so that an eNB notifies UE of information about the corresponding increased CRC length through predetermined (physical layer or high layer) signaling.

In this case, for example, a DL grant for a cell to which a corresponding rule is applied (a CRC length has been increased) may be considered to be a DL grant having relatively high reliability. Accordingly, a rule may be defined so that (exceptionally) corresponding HARQ-ACK PUCCH transmission is performed although (CASE#1-1) and/or (CASE#1-2) are generated in a corresponding (CRC length has been increased) cell, for example.

Furthermore, for example, a rule may be defined so that the rule of increasing the CRC length of a DL grant is limitedly applied only at an SF point of time at which the number of DL SF(s) on a configured cell(s) (or activated cell(s)) is a predetermined (or signaled) threshold or more. Furthermore, [Proposed Method#1] may also be extended and applied to [Proposed Method#2], for example.

Furthermore, for example, a cell(s) to which [Proposed Method#1] is applied may be configured as (or limited to) PCELL and/or an SCELL in which a PUCCH is transmitted (i.e., called a "PUCCH SCELL") and/or an SCELL(s) and/or the remaining SCELLs other than a predetermined (or signaled) SCELL.

[Proposed Method#2]

If [Proposed Method#1] is applied (or in the case of (CASE#1-1) and/or (CASE#1-2)), a rule may be defined so that a UE omits corresponding PUCCH transmission if an HARQ-ACK response for a corresponding DL grant-based PDSCH is NACK and performs corresponding PUCCH transmission (without any change) if an HARQ-ACK response for a corresponding DL grant-based PDSCH is ACK. In this case, for example, a rule may be defined so that the UE stores a PDSCH reception signal whose HARQ-ACK response is ACK in its own buffer and does not store a PDSCH reception signal whose HARQ-ACK response is NACK in its own buffer.

Thereafter, the UE may perform PUCCH transmission based on the determination (S1030). In this case, a detailed example in which the UE performs PUCCH transmission based on the determination has been described above.

[Proposed Method#3]

Figure 11:
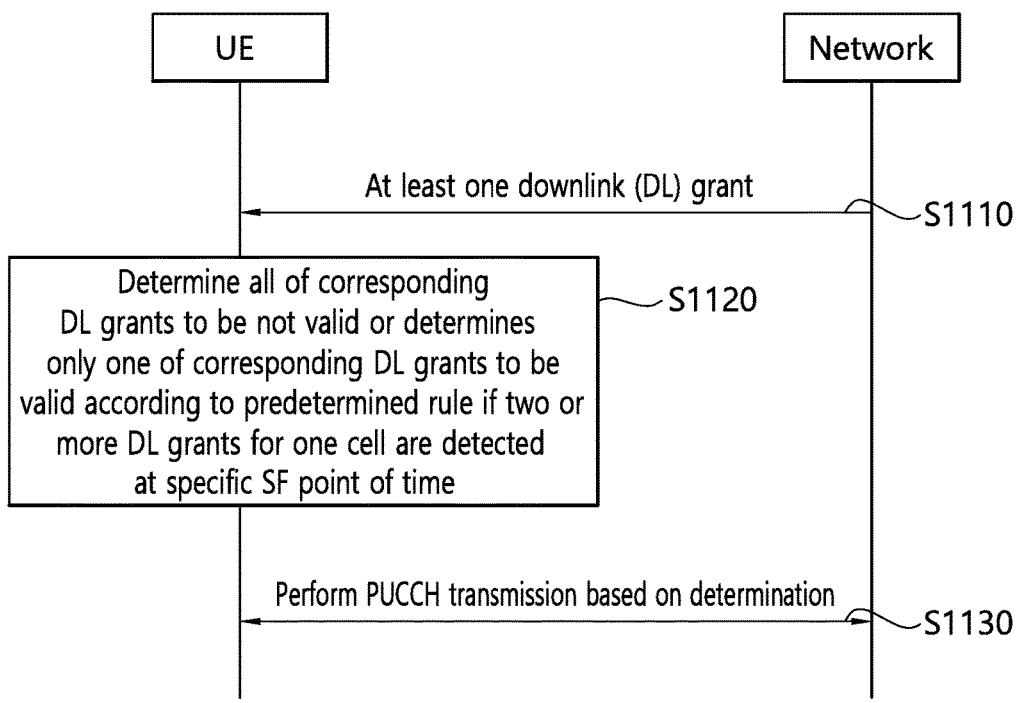
FIG. 11 is a flowchart of a CA method according to another embodiment of the present invention.

FIG. 11 is a flowchart of a CA method according to another embodiment of the present invention.

Referring to FIG. 11, a UE may receive at least one downlink (DL) grant from an eNB (S1110).

Thereafter, if two or more DL grants for one cell have been detected at a specific SF point of time, the UE determines all of the corresponding DL grants to be not valid or determines only one of the corresponding DL grants to be valid according to a predetermined rule (S1120). That is, the UE may determine a plurality of DL grants for one cell to be not valid DL grants if the plurality of DL grants is detected at a specific subframe point of time or may determine one of a plurality of DL grants for one cell to be a valid DL grant if the plurality of DL grants is detected at a specific subframe point of time.

More specifically, if two or more DL grants for one cell are detected at a specific SF point of time, a rule may be defined (OPTION#3-1) so that a UE considers all of the corresponding DL grants to be not valid (or all of the corresponding DL grants are discarded) or a rule may be defined (OPTION#3-2) so that a UE considers only one of corresponding DL grants to be valid (or selects one of the corresponding DL grants) according to a predetermined rule.

As a detailed example of (OPTION#3-2), a rule may be defined so that if two DL grants (i.e., a DL grant#A and a DL grant#B) for one cell are detected at the first (DL and/or special) SF within a bundling window (meaning a group of subframes) (i.e., according to the DL HARQ timeline, meaning a DL SF set in which an HARQ-ACK information-related PDSCH transmitted (together) at a specific one UL SF point of time is received), only the DL grant#A whose DAI value is 1 is considered to be valid if the DAI value of the DL grant#A is 1 and the DAI value of the DL grant#B is 2.

Thereafter, the UE may perform PUCCH transmission based on the determination (S1130). In this case, a detailed example in which the UE performs the PUCCH transmission based on the determination has been described above.

[Proposed Method#4]

Figure 12:
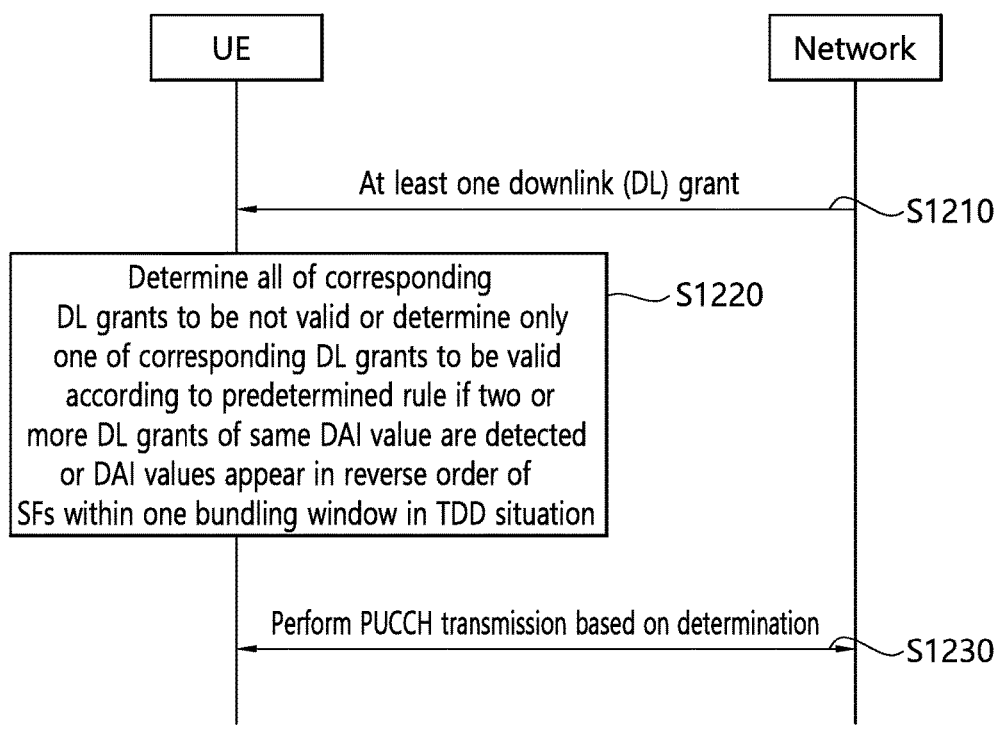
FIG. 12 is a flowchart of a CA method according to another embodiment of the present invention.

FIG. 12 is a flowchart of a CA method according to another embodiment of the present invention.

Referring to FIG. 12, a UE may receive at least one downlink (DL) grant from an eNB (S1210).

Thereafter, in a TDD situation, if two or more DL grants of the same DAI value are detected or DAI values appear in reverse order of SFs within one bundling window, the UE determines all of the corresponding DL grants to be not valid or determines only one of the corresponding DL grants to be valid according to a predetermined rule (S1220). That is, if a plurality of DL grants having the same downlink assignment index (DAI) value within one bundling window is detected, the UE may determine the plurality of DL grants to be not valid DL grants. Alternatively, if a plurality of DL grants having the same downlink assignment index (DAI) value within one bundling window is detected, the UE may determine one of the plurality of DL grants to be a valid DL grant and determine a DL grant other than the one DL grant of the plurality of DL grants to be an invalid DL grant. Alternatively, if a plurality of DL grants having the value of a downlink assignment index (DAI) corresponding to the reverse order of subframes within one bundling window is detected, the UE may determine the plurality of DL grants to be not valid DL grants. Alternatively, if a plurality of DL grants having the value of a downlink assignment index (DAI) corresponding to reverse order of subframes within one bundling window is detected, the UE may determine one of the plurality of DL grants to be a valid DL grant and determine a DL grant other than the one DL grant of the plurality of DL grants to be an invalid DL grant. Alternatively, if the detection interval of a first DL grant and second DL grant having the value of the same downlink assignment index (DAI) within one bundling window is a predetermined number of subframes or less, the UE determines a plurality of DL grants received by the UE to be not valid DL grants, but the plurality of DL grants may include the first DL grant and the second DL grant. Alternatively, if the detection interval of a first DL grant and second DL grant having the value of the same downlink assignment index (DAI) within one bundling window is a predetermined number of subframes or less, the UE determines one of a plurality of DL grants received by the UE to be a valid DL grant and determines a DL grant other than the one DL grant of the plurality of DL grants to be an invalid DL grant, but the plurality of DL grants may include the first DL grant and the second DL grant.

More specifically, in a TDD situation, if two or more DL grants of the same DAI value are detected (CASE#4-1) or DAI values appears in reverse order of SFs (CASE#4-2) within one bundling window, a rule may be defined (OPTION#4-1) so that a UE considers all of the corresponding DL grants (or all of DL grants detected within a corresponding bundling window) to be not valid or a rule may be defined (OPTION#4-2) so that a UE considers only one of the corresponding DL grants to be valid according to a predetermined rule.

For example, a case where a UE detects a DL grant having the value of a first DAI and a DL grant having the value of a second DAI at the same time within one bundling window and the value of the first DAI and the value of the second DAI are the same may correspond to (CASE#4-1).

For example, a case where the first subframe (hereinafter, a first subframe) and the second subframe (hereinafter, a second subframe) are present, the second subframe is located after the first subframe (or the second subframe neighbors the first subframe, wherein the second subframe is located after the first subframe), and the DAI value of the first subframe is smaller than the DAI value of the second subframe may correspond to (CASE#4-2).

In this case, for example, (CASE#4-1) (or (CASE#4-2)) includes a case where two or more DL grants of the same DAI value are detected on different SFs or the same SF within a bundling window (or a case where DAI values appear in reverse order of SFs on different SFs or the same SF within a bundling window).

Furthermore, for example, (CASE#4-1) and/or (CASE#4-2) may mean only a case where a bundling window size (i.e., "M") is smaller than or identical with 4. For example, in the case of (OPTION#4-2), if a DL grant#A of "DAI=K1" is received in an N1-th (DL and/or special) SF and a DL grant#B of "DAI=K2 (i.e., "K1>K2" or "K1≥K2")" is received in an N2 (i.e., "N2>N1")-th (DL and/or special) SF within one bundling window, a rule may be defined so that only the DL grant#A is considered to be valid.

In this case, for example, a rule may be defined so that such a rule is limitedly applied if a bundling window size (i.e., "M") is smaller than or identical with 4.

For another example, if the detection interval of DL grants having the same DAI value within one bundling window is Q (DL and/or special) SF(s) or less, a rule may be defined so that (OPTION#4-1) or (OPTION#4-2) is applied.

In this case, for example, the Q value may be configured to be 3. Furthermore, a rule may be defined so that an eNB notifies a UE of information about a corresponding Q value through predetermined (physical layer or high layer) signaling.

Furthermore, for example, such a rule may be extended and applied regardless of a bundling window size. As a detailed example, if the DL grants of "DAI=1", "DAI=2", "DAI=3" and "DAI=1" are detected in a DL SF#N, DL SF#(N+1), DL SF#(N+2) and DL SF#(N+3), respectively, within a bundling window including the four SFs (i.e., DL SF#N, DL SF#(N+1), DL SF#(N+2), DL SF#(N+3)), (OPTION#4-1) or (OPTION#4-2) is applied because the detection interval of DL grants having the same "DAI=1" is Q (i.e., 3) or less.

For another example, in a TDD situation, if DL grants of the same DAI value are detected as a predetermined (or signaled) number (e.g., 3) or more within one bundling window, a rule may be defined so that all of the DL grants detected within the corresponding bundling window are considered to be not valid.

Thereafter, the UE may perform PUCCH transmission based on the determination (S1230). In this case, a detailed example in which the UE performs PUCCH transmission based on the determination has been described above.

[Proposed Method#5]

Figure 13:
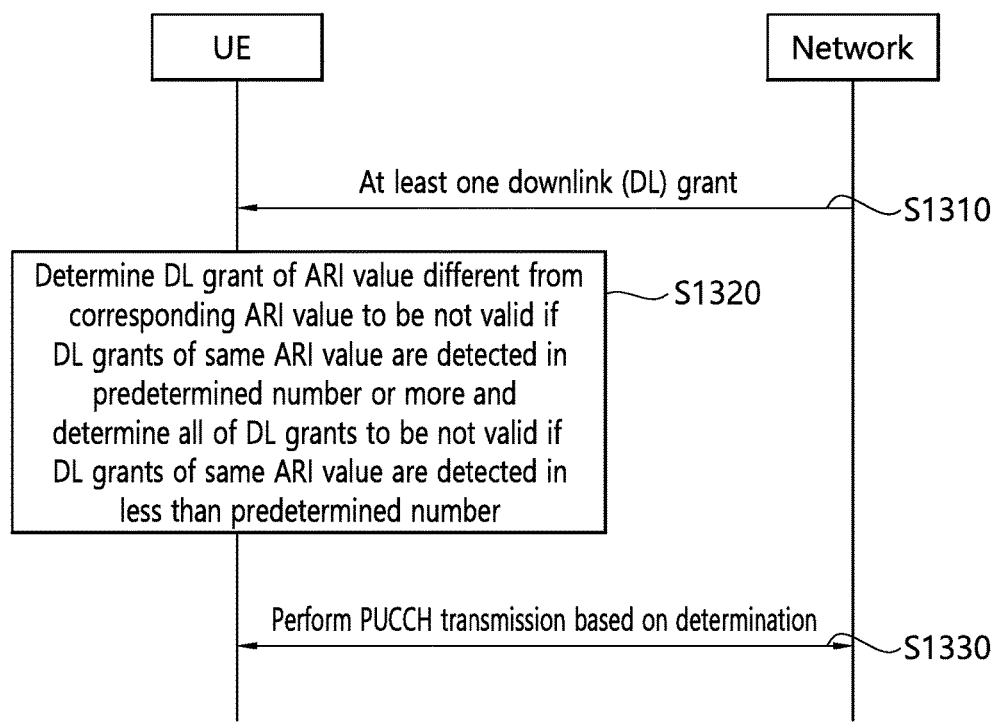
FIG. 13 is a flowchart of a CA method according to another embodiment of the present invention.

FIG. 13 is a flowchart of a CA method according to another embodiment of the present invention.

Referring to FIG. 13, the UE may receive a downlink (DL) grant from an eNB (S1310).

Thereafter, the UE may determine the DL grant of an ARI value different from a corresponding ARI value to be not valid if DL grants having the same ARI value and being a predetermined number or more are detected, and may determine all of DL grants to be not valid if the DL grants having the same ARI value and being less than a predetermined number are detected (S1320).

More specifically, a rule may be defined so that if the DL grants of the same ARI value are detected in a predetermined (or signaled) number or more (at a specific SF point of time (e.g., FDD CASE) or within one bundling window (e.g., TDD CASE)), the DL grant of an ARI value different from a corresponding ARI value is considered (or discarded) to be not valid and if the DL grants of the same ARI value are detected in less than a predetermined (or signaled) number (detected at a specific SF point of time (e.g., FDD CASE) or within one bundling window (e.g., TDD CASE)), all of the DL grants are considered (or discarded) to be not valid.

For another example, a rule may be defined so that if (all) DL grants detected (at a specific SF point of time (e.g., FDD CASE) or within one bundling window (e.g., TDD CASE)) do not have the same ARI value, all of the DL grants (detected at a specific SF point of time (e.g., FDD CASE) or within one bundling window (e.g., TDD CASE)) are considered to be invalid.

For another example, a rule may be defined (i.e., the remaining DL grants are considered to be invalid) so that only DL grants that belong to DL grants detected (at a specific SF point of time (e.g., FDD CASE) or within one bundling window (e.g., TDD CASE)) and that have relatively many (or small) detected ARI values are considered to be valid.

In this case, as a detailed example for a case where a corresponding rule is applied, if three DL grants of "ARI=2" and one DL grant of "ARI=1" (e.g., TDD CASE) are detected within one bundling window, a UE considers only the three DL grants of "ARI=2" to be valid (i.e., considers the one DL grant of "ARI=1" to be invalid).

Thereafter, the UE may perform PUCCH transmission based on the determination (S1330). In this case, a detailed example the UE performs PUCCH transmission based on the determination has been described above.

The aforementioned embodiments may be applied along with or in parallel to the following proposed methods.

[Proposed Method#6] In order to randomize (or distribute) interference from (E)PDCCH false detection-based erroneous PUCCH transmission, an "ARI state-to-PUCCH resource mapping" rule may be configured so that it is changed depending on an SF (or a cell or (PUCCH) CG in which a PUCCH is transmitted).

In this case, for example, the "ARI state-to-PUCCH resource mapping" rule may be defined so that it is changed according to a DL (a DL grant is received) DL and/or a special SF (or an UL SF in which a PUCCH is transmitted).

As a detailed example of a case where the corresponding rule is applied, ARIs 1/2/3/4 are mapped to PUCCH resources 1/2/3/4 (or indicate PUCCH resources 1/2/3/4) in an SF#N, but ARIs 1/2/3/4 are mapped to PUCCH resources 2/1/4/3 (indicate PUCCH resources 2/1/4/3) in an SF#(N+1).

Furthermore, for example, the "ARI state-to-PUCCH resource mapping" rule changed depending on an SF (or a cell or (PUCCH) CG in which a PUCCH is transmitted) may be differently configured for each UE group. Accordingly, interference exchanged due to (E)PDCCH false detection-based erroneous PUCCH transmission can be randomized (or distributed) between different UE groups.

[Proposed Method#7]

A rule may be defined so that a PUCCH resource is not allocated to a predetermined (or signaled) specific (some) ARI state and a UE omits corresponding PUCCH transmission when it receives the DL grant (or corresponding ARI state) of the corresponding specific (some) ARI state.

For another example, a rule may be defined so that a PUCCH resource is allocated to a predetermined (or signaled) specific (some) ARI state, but a UE omits corresponding PUCCH transmission when it receives the DL grant (or corresponding ARI state) of the corresponding specific (some) ARI state.

Furthermore, for example, in [Proposed Method#7], the (predetermined (or signaled)) specific (some) ARI state may be construed as being used as a criterion for determining DL grant false detection.

[Proposed Method#8]

The CRC length of a DL grant may be configured to be increased according to (some or all of) the following rules.

In this case, for example, a rule may be defined so that an eNB notifies a UE of information about the corresponding increased CRC length through predetermined (physical layer or high layer) signaling. Furthermore, for example, a rule may be defined so that [Proposed Method#8] is limitedly applied only at an SF point of time at which the number of DL SF(s) on a configured cell(s) (or activated cell(s)) is a predetermined (or signaled) threshold or more.

(Rule#8-1) A rule may be defined so that the existing CRC length (e.g., 16 bits) is maintained in the case of a DL grant for a specific (some) CG including a predetermined (or signaled) specific cell.

In this case, for example, the predetermined (or signaled) specific cell may be configured as a PCELL and/or a PUCCH SCELL. For another example, a rule may be defined so that so that the existing CRC length (e.g., 16 bits) is maintained in the case of a DL grant for a predetermined (or signaled) specific cell.

In this case, for example, the predetermined (or signaled) specific cell may be configured as a PCELL and/or a PUCCH SCEL. For another example, a rule may be defined so that the existing CRC length (e.g., 16 bits) is maintained in the case of a DL grant received through a common search space (CSS).

For example, according to (Rule#8-1), the CRC length of a DL grant for a cell in which the existing CRC length is maintained and/or the remaining cells other than a CG- and/or SS-related DL grant and/or an SCELL other than a CG including CG- and/or SS-related DL grants (e.g., a PCELL (/PUCCH SCELL), a DL grant for all of SCELLs (except a PCELL (/PUCCH SCELL)), a UE-specific search space (USS)-based DL grant) is increased.

(Rule#8-2) According to the (Rule#8-1), in the case of an UL grant for a cell whose DL grant CRC length is increased, a rule may be defined so that the CRC length of the UL grant is (identically) increased or a rule may be defined so that the existing CRC length (e.g., 16 bits) is maintained.

In this case, for example, in the case of the former (i.e., the CRC length of an UL grant is also (identically) increased), a rule may be defined so that only the CRC length of the DCI format 0 is increased (for size setting with the DCI format 1A) or a rule may be defined so that the CRC lengths of all the UL scheduling DCI formats (e.g., DCI format 0 and DCI format 4) are increased.

[Proposed Method#9]

(In (some) of the proposed methods (e.g., [Proposed Method#1], [Proposed Method#2] and [Proposed Method#8])), an increase in the CRC length of a DL grant (and/or UL grant) may be configured so that it is performed according to (some or all of) the following rules.

Prior to a detailed description of the proposed methods, for example, the existing CRC generation and scrambling operation of a DL/UL grant is performed according to the aforementioned CRC-related contents.

For example, hereinafter, for convenience of description of the proposed methods, a situation in which the CRC length increases to Z bits (e.g., 24) is assumed. However, the proposed methods of the present invention may also be extended and applied to a case where the CRC length is increased in a different length (e.g., 32 bits). Furthermore, for example, a rule may be defined so that [Proposed Method#9] is limitedly applied only at an SF point of time at which the number of DL SF(s) on a configured cell(s) (or activated cell(s)) is a predetermined (or signaled) threshold or more.

(Rule#9-1) For example, a rule may be defined (OPTION#9-1) so that the CRC of Z bits (e.g., 24) is finally generated by attaching the CRC parity bit(s) (i.e., "$b_A$, $b_{A+1}$, ..., $b_{A+X-1}$") of the existing X bits (e.g., 16) (generated according to the aforementioned contents related to CRC) and (predetermined (or signaled)) Y bits (e.g., 8) of the CRC parity bit(s) (i.e., "$b_A$, $b_{A+1}$, ..., $b_{A+X-1}$") of the corresponding existing X bits with a cyclic shift (i.e., having the relation of "Z=X+Y").

In this case, for example, if such a rule is applied, the CRC of the Z bits (e.g., 24) may have a "$b_A$, $b_{A+1}$, ..., $b_{A+X-1}$, $b_A$, $b_{A+1}$, ..., $b_{A+Y-1}$" (or "$b_A$, $b_{A+1}$, ..., $b_{A+X-1}$, $b_{A+X-Y}$, $b_{A+X-Y+1}$, ..., $b_{A+X-1}$" or "$b_A$, $b_{A+1}$, ..., $b_{A+Y-1}$, $b_A$, $b_{A+1}$, ..., $b_{A+X-1}$" or "$b_{A+X-Y}$, $b_{A+X-Y+1}$, ..., $b_{A+X-1}$, $b_A$, $b_{A+1}$, ..., $b_{A+X-1}$") form. In this case, for another example, a rule may be defined (i.e., X bits (e.g., 16) (only the CRC parity bit(s)) are scrambled as the (C-)RNTI of the existing H bits (e.g., 16) (e.g., the relation of "H=X" may be defined)) so that the Y bits (e.g., 8) (CRC parity bit(s)) are not scrambled as the (C-)RNTI (i.e., "$x_{rnti,0}$, $x_{rnti,1}$, ..., $x_{rnti,H-1}$") of the existing H bits (e.g., 16).

For another example, a rule may be defined (OPTION#9-2) so that the CRC of the Z bits (e.g., 24) is derived (or generated) according to a method of generating the CRC parity bit(s) of "L=Z (e.g., 24)" (the aforementioned contents related to CRC).

In this case, for example, payload input bit(s) used to generate the CRC parity bit(s) of "L=Z (e.g., 24)" are "$a_0$, $a_1$, $a_2$, $a_3$, ..., $a_{A-1}$" (i.e., refer to the aforementioned contents related to CRS). In this case, for another example, a rule may be defined (i.e., only (Z−Y) bits (e.g., 16) (CRC parity bit(s)) may be scrambled as the (C-)RNTI of the existing H bits (e.g., 16) (e.g., the relation of "(Z−Y)=H" may be defined)) so that Y bits (e.g., 8) (CRC parity bit(s)) behind (or ahead of) (predetermined (or signaled)) Z bits (e.g., 24) (CRC parity bit(s)) are not scrambled as the (C-)RNTI (i.e., "$x_{rnti,0}$, $x_{rnti,1}$, . . . , $x_{rnti,H-1}$") of the existing H bits (e.g., 16).

For another example, if the CRC length is increased to Z bits (e.g., 24), a rule may be defined (i.e., having the relation of "Z=X+Y") (OPTION#9-3) so that (1) the CRC parity bit(s) of "L=X (e.g., 16)" are first generated (i.e., "$p_0$, $p_1$, . . . , $p_{X-1}$") using the payload input bit(s) of "$a_0$, $a_1$, $a_2$, $a_3$, . . . , $a_{A-1}$" (i.e., refer to the aforementioned contents related to CRC) and (2) the CRC parity bit(s) of "L=Y (e.g., 8)" are generated (i.e., "$q_0$, $q_1$, . . . , $q_{Y-1}$") again using the payload input bit(s) of (the same) "$a_0$, $a_1$, $a_2$, $a_3$, . . . , $a_{A-1}$" so that the CRC parity bit(s) (e.g., "$p_0$, $p_1$, . . . , $p_{X-1}$, $q_0$, $q_1$, . . . , $q_{Y-1}$" or "$q_0$, $q_1$, . . . , $q_{Y-1}$, $p_0$, $p_1$, . . . , $p_{X-1}$") of the final 24 bits are generated.

In this case, for another example, a rule may be defined (i.e., only X bits (e.g., 16) (CRC parity bit(s)) are scrambled as the (C-)RNTI of the existing H bits (e.g., 16) (e.g., the relation of "H=X" may be defined)) so that Y bits (e.g., 8) (CRC parity bit(s)) are not scrambled as the (C-)RNTI (i.e., "$x_{rnti,0}$, $x_{rnti,1}$, . . . , $x_{rnti,H-1}$") of the existing H bits (e.g., 16). For another example, if the CRC length is increased to Z bits (e.g., 24), a rule may be defined (i.e., having the relation of "Z=X+Y") (OPTION#9-4) so that (1) the CRC parity bit(s) of "L=X (e.g., 16)" are first generated (i.e., "$p_0$, $p_1$, . . . , $p_{X-1}$") using the payload input bit(s) of "$a_0$, $a_1$, $a_2$, $a_3$, . . . , $a_{A-1}$" (i.e., refer to the aforementioned contents related to CRC) and (2) the CRC parity bit(s) of "L=Y (e.g., 8)" are generated again (i.e., "$f_0$, $f_1$, . . . , $f_{Y-1}$") using the payload input bit(s) of "$a_0$, $a_1$, $a_2$, $a_3$, . . . , $a_{A-1}$, $p_0$, $p_1$, . . . , $p_{X-1}$" so that the CRC parity bit(s) (e.g., "$p_0$, $p_1$, . . . , $p_{X-1}$, $f_0$, $f_1$, . . . , $f_{Y-1}$" or "$f_0$, $f_1$, . . . , $f_{Y-1}$, $p_0$, $p_1$, . . . , $p_{X-1}$") of the final 24 bits are generated.

In this case, for another example, a rule may be defined (i.e., only the X bits (e.g., 16) (CRC parity bit(s)) are scrambled as the (C-)RNTI of the existing H bits (e.g., 16) (e.g., the relation of "H=X" may be defined)) so that Y bits (e.g., 8) (CRC parity bit(s)) are not scrambled as the (C-)RNTI (i.e., "$x_{rnti,0}$, $x_{rnti,1}$, . . . , $x_{rnti,H-1}$") of the existing H bits (e.g., 16).

For another example, if the CRC length is increased to Z bits (e.g., 24), a rule may be defined (i.e., having the relation of "Z=X+Y") (OPTION#9-5) so that (1) the CRC parity bit(s) of "L=X (e.g., 16)" are first generated (i.e., "$p_0$, $p_1$, . . . , $p_{X-1}$") using the payload input bit(s) of "$a_0$, $a_1$, $a_2$, $a_3$, . . . , $a_{A-1}$" (i.e., refer to the aforementioned contents related to CRC) and (2) the CRC parity bit(s) of "L=Y (e.g., 8)" are generated (i.e., "$e_0$, $e_1$, . . . , $e_{Y-1}$") using the payload input bit(s) of "$p_0$, $p_1$, . . . , $p_{X-1}$" so that the CRC parity bit(s) (e.g., "$p_0$, $p_1$, . . . , $p_{X-1}$, $e_0$, $e_1$, . . . , $e_{Y-1}$" or "$e_0$, $e_1$, . . . , $e_{Y-1}$, $p_0$, $p_1$, . . . , $p_{X-1}$") of the final 24 bits are generated.

In this case, for another example, a rule may be defined (i.e., only the X bits (e.g., 16) (CRC parity bit(s)) are scrambled as the (C-)RNTI of the existing H bits (e.g., 16) (e.g., the relation of "H=X" may be defined)) so that Y bits (e.g., 8) (CRC parity bit(s)) are not scrambled as the (C-)RNTI (i.e., "$x_{rnti,0}$, $x_{rnti,1}$, . . . , $x_{rnti,H-1}$") of the existing H bits (e.g., 16). For another example, if the CRC length is increased to Z bits (e.g., 24), a rule may be defined (i.e., having the relation of "Z=X+Y") (OPTION#9-6) so that an eNB notifies a UE of information of Y bits (e.g., 8) to be additionally attached to the back (or front) of the CRC parity bit(s) (i.e., "$b_A$, $b_{A+1}$, . . . , $b_{A+X-1}$") of the existing X bits (e.g., 16) (generated according to the aforementioned contents related to CRC) through predetermined (physical layer or high layer) signaling.

In this case, for another example, a rule may be defined so (i.e., only the X bits (e.g., 16) (CRC parity bit(s)) are scrambled as the (C-)RNTI of the existing H bits (e.g., 16) (e.g., the relation of "H=X" may be defined)) so that Y bits (e.g., 8) (CRC parity bit(s)) are not scrambled as the (C-)RNTI (i.e., "$x_{rnti,0}$, $x_{rnti,1}$, . . . , $x_{rnti,H-1}$") of the existing H bits (e.g., 16).

(Rule#9-2) a rule may be defined so that the CRC parity bit(s) of Z bits (e.g., 24) (generated according to (Rule#9-1)) are scrambled as the (virtual or new) RNTI of Z bits (e.g., 24) generated according to (some or all of) embodiments.

(Embodiment#9-2-1) A rule may be defined (i.e., having the relation of "Z=H+S") so that the (virtual or new) RNTI of Z bits (e.g., 24) is finally generated by attaching (predetermined (or signaled)) the (C-)RNTI (i.e., "$x_{rnti,0}$, $x_{rnti,1}$, . . . , $x_{rnti,H-1}$") of the existing H bits (e.g., 16) and S bits (e.g., 8) of the (C-)RNTI of the corresponding existing H bits (e.g., 16) with a cyclic shift. In this case, for example, if such a rule is applied, the (virtual or new) RNTI of the Z bits (e.g., 24) may have a "$x_{rnti,0}$, $x_{rnti,1}$, . . . , $x_{rnti,H-1}$, $x_{rnti,0}$, $x_{rnti,1}$, . . . , $x_{rnti,S-1}$" (or "$x_{rnti,0}$, $x_{rnti,1}$, . . . , $x_{rnti,H-1}$, $x_{rnti,H-S}$, $x_{rnti,H-S+1}$, . . . , $x_{rnti,H-1}$" or "$x_{rnti,0}$, $x_{rnti,1}$, . . . , $x_{rnti,S-1}$, $x_{rnti,0}$, $x_{rnti,1}$, . . . , $x_{rnti,H-1}$" or "$x_{rnti,H-S}$, $x_{rnti,H-S+1}$, . . . , $x_{rnti,H-1}$, $x_{rnti,0}$, $x_{rnti,1}$, . . . , $x_{rnti,H-1}$") form.

(Embodiment#9-2-2) A rule may be defined so that an eNB notifies UE of information about S bits (e.g., 8) to be additionally attached to the back (or front) of the (C-)RNTI (i.e., "$x_{rnti,0}$, $x_{rnti,1}$, . . . , $x_{rnti,H-1}$") of the existing H bits (e.g., 16) through predetermined (physical layer or high layer) signaling.

[Proposed Method#10] A rule may be defined so that (some or all of) the proposed methods (e.g., [Proposed Method#1], [Proposed Method#2]) are limitedly applied if the coding rate of a (received/detected) (specific cell(s)) (DL/UL) grant is greater than (or smaller than) a predetermined (or signaled) threshold.

[Proposed Method#11]

If the coding rate of a (DL/UL) grant is relatively increased (and/or if the CRC length of the (DL/UL) grant is increased) compared to the existing coding rate through (some or all of) the proposed methods, for the transmission/reception of the corresponding (DL/UL) grant with high reliability, a BD number for each AL (related to a (DL/UL) grant) may be (re)defined according to (some or all of) the following rules.

(Rule#11-1) (Some or all of) predetermined (or signaled) relatively-low BD numbers of AL(s) may be configured so that they are reallocated as the relatively high BD numbers of AL(s).

As a detailed example, if the rule is applied in the situation in which BD numbers for respective "ALs {1, 2, 4, 8}" have been defined as "BDs {6, 6, 2, 2}", the BD numbers for the respective "ALs {1, 2, 4, 8}" may be changed to "BDs {4, 4, 4, 4}" (i.e., the No. 2 BD number of the AL "1" has been reallocated as the AL "4" and the No. 2 BD number of the AL "2" has been reallocated as the AL "8") (or "BDs {2, 6, 6, 2}" (i.e., the No. 4 BD number of the AL "1" has been reallocated as the AL "4") or "BDs {0, 6, 6, 4}" (i.e., the No. 4 BD numbers of all of 6 BD numbers of the AL "1" have been reallocated as the AL "4" and the No. 2 BD number has been reallocated as the AL "8")).

For another example, (if the coding rate of a (DL/UL) grant is relatively increased compared to the existing coding rate (and/or if the CRC length of the (DL/UL) grant is increased)), for the transmission/reception of the corresponding (DL/UL) grant with high reliability, a rule may be defined so that a minimum AL value (related to a (DL/UL) grant) and/or the number of (E)REGs forming one (E)CCE are (re)defined.

As a detailed example, if the rule is applied in the situation in which the "BD numbers for respective ALs {1, 2, 4, 8}" have been defined as "BDs {6, 6, 2, 2}", a minimum AL value is increased from "1" to "2". Accordingly, if an AL set having the BD numbers of the "BDs {6, 6, 2, 2}" is changed to "ALs {2, 4, 8, 16}" (i.e., if the amount of resources on the (E)PDCCH region is sufficient to support a plurality of relatively high AL(s), a (total) of BD numbers may be configured to be maintained) (or if an AL set having the BD numbers of "BDs {3, 3, 1, 1}" is changed to "ALs {2, 4, 8, 16}" (i.e., if the amount of resources the an (E)PDCCH region is not sufficient to support a plurality of relatively high AL(s), a (total) of BD numbers may be configured to be reduced (by half)).

For another example, if the rule is applied, the number of (E)REGs forming one (E)CCE may be changed from "4" to "8."

For another example, a rule may be configured so that [Proposed Method#11] is limitedly applied to a PDCCH (and/or EPDCCH) ((UL/DL) grant) and/or a cell (scheduling)-(UL/DL) grant having a system bandwidth of a predetermined (or signaled) threshold or more (or less) and/or a predetermined (or signaled) TM-(UL/DL) grant and/or a predetermined (or signaled) format-based (UL/DL) grant and/or an (UL/DL) grant transmitted through a predetermined (or signaled) SS and/or a case where a predetermined (or signaled) CP configuration has been configured (in a cell in which an (UL/DL) grant is detected) and/or a case where a predetermined (or signaled) specific special subframe configuration has been configured (in a cell in which an (UL/DL) grant is detected) and/or a case where an RE number available for (UL/DL) grant transmission per an ((E)PDCCH) pair (RB) is smaller than a predetermined (or signaled) threshold (in a cell in which an (UL/DL) grant is detected).

It is an evident fact that examples of the aforementioned proposed method may also be considered to be a kind of proposed methods because they may be included as implementation methods of the present invention. Furthermore, the aforementioned proposed methods may be independently implemented, but may be implemented in the form of a combination (or merge) of some of the proposed methods.

Furthermore, for example, a rule may be defined so that the aforementioned proposed methods are limitedly applied to only a CG having a predetermined (or signaled) specific cell type (e.g., UCELL or LCELL) and/or a specific cell type (e.g., UCELL or LCELL). Furthermore, for example, a rule may be defined so that the aforementioned proposed methods are differently applied to each cell type and/or (PUCCH) CG (and/or cell).

Furthermore, for example, a rule may be configured so that the aforementioned proposed methods are limited applied to only a PDCCH (and/or EPDCCH) ((UL/DL) grant) and/or a cell (scheduling)-(UL/DL) grant having a system bandwidth of a predetermined (or signaled) threshold or more (or less) and/or a predetermined (or signaled) TM-(UL/DL) grant and/or a predetermined (or signaled) format-based (UL/DL) grant and/or an (UL/DL) grant transmitted through a predetermined (or signaled) SS and/or a case where a predetermined (or signaled) CP configuration has been configured (in a cell in which an (UL/DL) grant is detected) and/or a case where a predetermined (or signaled) specific special subframe configuration has been configured (in a cell in which an (UL/DL) grant is detected) and/or a case where an RE number available for (UL/DL) grant transmission per ((E)PDCCH) pair (RB) is smaller than a predetermined (or signaled) threshold (in a cell in which an (UL/DL) grant is detected).

Figure 14:
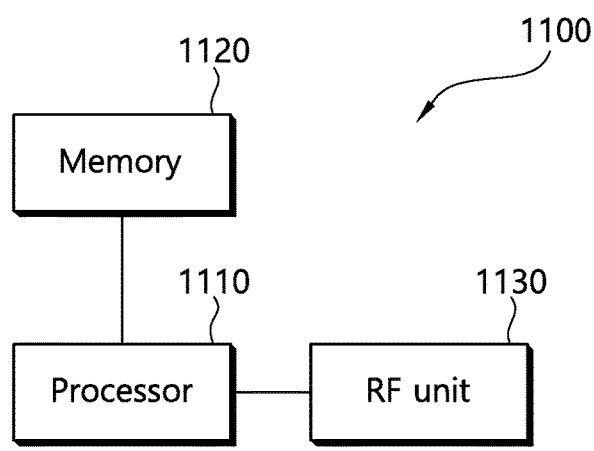
FIG. 14 is a block diagram showing a UE in which the embodiment of the present invention is implemented.

FIG. 14 is a block diagram showing a UE in which the embodiment of the present invention is implemented.

Referring to FIG. 14, a UE 1100 includes a processor 1110, memory 1120 and a radio frequency (RF) unit 1130. The processor 1110 implements the proposed functions, processes and/or methods. For example, the processor 1110 may receive a downlink (DL) grant through the RF unit 1130. Thereafter, the processor 1110 may determine whether the DL grant corresponds to a valid DL grant. Thereafter, the processor 1110 may perform PUCCH transmission based on the determination.

The RF unit 1130 is connected to the processor 1110 and transmits and receives radio signals.

The processor may include an application-specific integrated circuit (ASIC), other chipsets, logic circuits and/or data processors. The memory may include read-only memory (ROM), random access memory (RAM), flash memory, memory cards, storage media and/or other storage devices. The RF unit may include baseband circuits for processing radio signals. When the embodiment is implemented in software, the aforementioned scheme may be implemented as a module (process or function) that performs the aforementioned function. The module may be stored in the memory and executed by the processor. The memory may be located inside or outside the processor and may be connected to the processor by a variety of well-known means.

What is claimed is:

1. A method for performing a transmission of a physical uplink control channel (PUCCH) in a wireless communication system, the method performed by a user equipment (UE), which is configured with carrier aggregation (CA), and comprising:
receiving, from a base station, a first downlink grant and a second downlink grant,
wherein the first downlink grant and the second downlink grant are downlink grants for one specific cell; and
performing transmission of the PUCCH for one of the first downlink grant and the second downlink grant based on which of the first downlink grant and the second downlink grant is a valid downlink grant,
wherein the first downlink grant and the second downlink grant are downlink grants within a bundling window,
wherein the first downlink grant and the second downlink grant are detected on a first subframe in the bundling window,
wherein when a value of a downlink assignment index (DAI) for the first downlink grant is 1 and a value of a DAI for the second grant is 2, the UE determines that the first downlink grant is the valid downlink grant and the UE performs the transmission of the PUCCH for the first downlink grant which is the valid downlink grant.

2. A user equipment (UE), comprising:
a transceiver that transmits and receives radio signals; and
a processor operatively coupled to the transceiver,
wherein the processor is configured to:
control the transceiver to receive, from a base station, a first downlink grant and a second downlink grant,
wherein the first downlink grant and the second downlink grant are downlink grants for one specific cell; and
perform a transmission of a physical uplink control channel (PUCCH) for one of the first downlink grant and the second downlink grant based on which of the first downlink grant and the second downlink grant is a valid downlink grant, wherein the first downlink grant and the second downlink grant are downlink grants within a bundling window, wherein the first downlink grant and the second downlink grant are detected on a first subframe in the bundling window, and wherein when a value of a downlink assignment index (DAI) for the first downlink grant is 1 and a value of a DAI for the second grant is 2, the UE determines that the first downlink grant is the valid downlink grant and the UE performs the transmission of the PUCCH for the first downlink grant which is the valid downlink grant.

* * * * *